US007929931B2

(12) United States Patent
Nakamura et al.

(10) Patent No.: US 7,929,931 B2
(45) Date of Patent: Apr. 19, 2011

(54) BROADCAST RECEIVER

(75) Inventors: Haruhiko Nakamura, Yaita (JP); Haruhito Watanabe, Tochigi (JP); Mamoru Oda, Noda (JP)

(73) Assignee: Sharp Kabushiki Kaisha, Osaka (JP)

( * ) Notice: Subject to any disclaimer, the term of this patent is extended or adjusted under 35 U.S.C. 154(b) by 872 days.

(21) Appl. No.: 11/793,757

(22) PCT Filed: Mar. 23, 2005

(86) PCT No.: PCT/JP2005/005185

§ 371 (c)(1), (2), (4) Date: Jun. 21, 2007

(87) PCT Pub. No.: WO2006/067871

PCT Pub. Date: Jun. 29, 2006

(65) Prior Publication Data

US 2009/0124226 A1 May 14, 2009

(30) Foreign Application Priority Data

Dec. 24, 2004 (JP) ................................ 2004-374974

(51) Int. Cl.
*H04B 1/18* (2006.01)

(52) U.S. Cl. .................. 455/185.1; 455/3.01; 455/3.02; 455/525; 455/436; 348/568; 348/569; 725/46

(58) Field of Classification Search ............... 455/185.1, 455/3.01, 3.02, 525, 436; 348/568, 569; 725/46
See application file for complete search history.

(56) References Cited

U.S. PATENT DOCUMENTS

| | | | | |
|---|---|---|---|---|
| 5,969,769 | A * | 10/1999 | Hamadate | 348/568 |
| 6,870,573 | B2 * | 3/2005 | Yeo et al. | 348/569 |
| 7,437,121 | B2 * | 10/2008 | Itoh et al. | 455/3.01 |
| 2003/0140342 | A1 * | 7/2003 | Hasebe et al. | 725/46 |
| 2003/0163817 | A1 * | 8/2003 | Han | 725/46 |
| 2007/0281644 | A1 * | 12/2007 | Olgen | 455/186.1 |

FOREIGN PATENT DOCUMENTS

| | | | |
|---|---|---|---|
| JP | 6-77779 | A | 3/1994 |
| JP | 10-290441 | A | 10/1998 |
| JP | 2001-76461 | A | 3/2001 |
| JP | 2002-58013 | A | 2/2002 |
| JP | 2002-344858 | A | 11/2002 |

(Continued)

OTHER PUBLICATIONS

Apple—iPod—Technical Specifications, http://www.apple.com/ipod/specs.html.

*Primary Examiner* — Sanh D Phu
(74) *Attorney, Agent, or Firm* — Birch, Stewart, Kolasch & Birch, LLP

(57) ABSTRACT

A broadcast receiver which can receive broadcast by directly selecting a discretionary broadcast station from all the receivable broadcast stations. The broadcast receiver is provided with a broadcast receiving section having broadcast station searching means for searching a carrier frequency of the receivable broadcast station. The receivable carrier frequencies searched by the broadcast station searching means are displayed as a list of broadcast station information on a display section, a specification from the list of broadcast station information displayed on the display section is accepted by operation of an operating section, and broadcast of the carrier frequency corresponding to the accepted specification is permitted to be received by the broadcast receiving section.

23 Claims, 13 Drawing Sheets

FOREIGN PATENT DOCUMENTS

| | | | |
|---|---|---|---|
| JP | 2003-18032 | A | 1/2003 |
| JP | 2003-30205 | A | 1/2003 |
| JP | 2003-32568 | A | 1/2003 |
| JP | 2003-69908 | A | 3/2003 |
| JP | 2003-78836 | A | 3/2003 |
| JP | 2003-152567 | A | 5/2003 |
| JP | 2003-158690 | A | 5/2003 |
| JP | 2003-198397 | A | 7/2003 |
| JP | 2004-165860 | A | 6/2004 |
| TW | 493343 | B | 7/2002 |
| WO | WO-01/17237 | A1 | 3/2001 |
| WO | WO 2004/098079 | A1 | 11/2004 |

* cited by examiner

FIG. 5

(a)

| REGION | STATION NAME | NICKNAME | CARRIER FREQUENCY | GENRE |
|---|---|---|---|---|
| HOKKAIDO | | | | |
| TOHOKU | | | | |
| KANTO | | | | |
| | | | | |

(b)

| REGION | STATION NAME | NICKNAME | FREQUENCY (MHz) | GENRE |
|---|---|---|---|---|
| KANTO | FM TOCHIGI | RADIO BERRY | UTSUNOMIYA 76.4<br>ASHIKAGA 78.3<br>SHIOBARA 78.5<br>IMAICHI 79.1 | |
| | FM GUMMA | | KUSATSU 76.7<br>NUMATA 77.8<br>TONE 79.4 | |

BROADCAST RECEIVER

CROSS-REFERENCE TO RELATED APPLICATIONS

This application is a national stage entry of PCT International Application No. PCT/JP05/005185 which has an International filing date of Mar. 23, 2005 and designated the United States of America.

BACKGROUND

1. Field of the Invention

The present invention relates to a broadcast receiver which can receive broadcast by directly selecting a discretionary broadcast station from all the receivable broadcast stations. Also, the present invention relates to the broadcast receiver capable of recording a contents of the received broadcast in a recording medium and reproducing it therefrom, and further capable of accompanyingly reproducing the contents downloaded from an external computer.

2. Description of Related Art

A radio and a TV receiver are given as examples as typical devices for receiving a broadcast, specifically the broadcast of only voice (including character information in some cases), and the broadcast of voice and image, respectively. A conventional broadcast receiver of this kind is provided with a function called preset to previously select and set several receivable broadcast stations (channels) by a manufacturer or a user. However, such a preset function is only provided with preset buttons capable of allotting about 10 channels at most, for example, like an audio device for an automobile (car audio device)

When a broadcast station is newly opened, a user must preset this broadcast station (channel) by oneself so as to receive this broadcast station. Further, in the car audio device or a portable broadcast receiver, the preset broadcast station can not be received in some cases when moved to an outside a region in which this broadcast station is usually used.

In recent years, a device not only capable of receiving the broadcast but also capable of recording and reproducing contents such as a music and an image depending on a preference of a user has been widely spread. As an example of such a device, a portable music reproducing device called as a headphone stereo has been spread. Such a music reproducing device includes a reproduction only type and a rewriting type capable of recording. The recording medium of the rewriting type is gradually developed into an audio cassette tape, CD, MD, and HD to attain large capacity, and also is moved to a random accessible type. Also, in recent years, a similar device capable of recording and reproducing not only the music but also the image as a content is also in practical use.

Incidentally, in recent years, the HD has been adopted as described above as the recording medium for recording contents to be reproduced, and this makes it possible to record a significantly large amount of contents compared to a case of adopting the conventional recording medium, by using a point that a storage capacity is increased. Therefore, the Internet has been used as a source of the content, which has not been so focused before the HD is adopted.

For example, the iPod (product name: see http://WWW.apple.com/JP/ipod/specs.htm), which is a portable music reproducing device commercialized by Apple Computer, Inc. is capable of managing and sharing a music collection obtained by downloading and accumulating music data and various information that comes with the music data (for example, music title and content information such as a performer) from a particular Web site to an external computer connected with the Internet, and is capable of reproducing the music data by the computer itself. Further, by connecting such a computer and the iPod through a communication cable, the music data downloaded and accumulated from the particular Web site to the computer is transmitted to the iPod. In other words, by downloading this music data from the computer to the iPod, the iPod can be used as a portable music reproducing device, specifically as a headphone stereo. Note that there is a device of this kind accessible to the particular Web site directly through the Internet without through the computer. However, in this case also, there is no difference in connecting with the external computer (through the Internet).

The iPod has a function to display as a list the information such as a music title for specifying the music data downloaded from the computer, and reproduce the music data selected by a user from the information displayed as the list. The music data accumulated in the computer is compressively encoded by a WMA format when an OS (operating system) of the computer is Windows®, and this is converted into an AAC format by the iPod, and further is compressed and recorded in the HD, being the recording medium, as data, to make it possible to reproduce this data as needed. In addition, when the user desires a high sound quality, it is also possible to encode by the Apple Lossless format with low compression rate.

Meanwhile, as a device capable of receiving the broadcast and accessible to the content that exists on the Internet, a part of the aforementioned car audio device has the aforementioned function, and a receiving terminal described in Japanese Patent Application Laid-Open No. 2002-58013 is known.

However, as described above, the car audio device capable of receiving the broadcast is only provided with the preset button capable of allotting about 10 channels at most, for example, and when the broadcast station is newly opened, the user must preset the broadcast station by oneself so as to receive the broadcast station. Further, in the car audio device or the portable broadcast receiver, the preset broadcast station can not be received in some cases when moved to an outside the region where this broadcast station is usually used.

Further, in the prior art disclosed in the Japanese Patent Application Laid-Open No. 2002-58013, in which detailed information of the contents of the broadcast is received by a user terminal through the Internet, the information on the broadcast station itself, particularly the information on the broadcast station newly opened can not be obtained and used.

Still further, the iPod can not receive, record, and reproduce the broadcast information. Specifically, in the iPod, the contents, specifically the music data can be downloaded only from a particular Web site, thereby having a limit in collecting the content. In addition, the content whose copyright is protected can not be downloaded through the Internet, and therefore in this aspect also, the iPod has a limit in collecting the content.

Further, as described above, the iPod is capable of collecting the contents through the Internet only from the particular Web site. Therefore, as a matter of course, it is impossible to use these contents together with the contents obtained from other source (a recording medium such as a CD possessed by the user and various broadcasts, etc).

Further, in order to high-sound quality reproduction, the iPod adopts the Apple Lossless encode of its own format, whose compression rate is low, and therefore has a structure responding to a plurality of encode systems in addition to the encode system of high compression rate. This means that a plurality of decoders responding to each system is required for reproducing the music data which is compressively encoded by a plurality of systems. Therefore, a scale of circuit, a scale of mounting, and further an increase of power consumption required accordingly are caused, and it can not be denied that these factors become disadvantageous to the portable device.

SUMMARY

In view of the above-described problems, the present invention is devised, and a main object of the present invention is to provide a broadcast receiver capable of directly selecting and receiving a discretionary broadcast station from all of the receivable broadcast stations. In addition, another object of the present invention is also to provide the broadcast station capable of recording contents of the received broadcast in the recording medium and making it reproducible, and further capable of accompanyingly reproducing the content downloaded from the external computer.

Simply stated, the present invention adopts a configuration of searching a receivable broadcast station and displaying its result as the list, and directly selecting and receiving the broadcast station from this display on the list. Also, the present invention adopts a configuration of recording the content downloaded from the computer in a recording medium, and making the content recorded in the recording medium reproducible, and also recording in the recording medium the content acquired by receiving the broadcast in the same way as the information downloaded from the computer and making it reproducible.

The broadcast receiver of the present invention comprises: broadcast receiving means for receiving a broadcast; broadcast station searching means for searching a carrier frequency of a broadcast station receivable by said broadcast receiving means; and a display section, the receiver further comprising: storing means for storing a receivable carrier frequency searched by said broadcast station searching means; display controlling means for displaying on said display section the carrier frequency stored in said storing means as a list of broadcast station information; accepting means for accepting specifying of any one out of the list of the broadcast station information displayed on said display section; and receiving controlling means for making said broadcast receiving means receive the broadcast of the carrier frequency corresponding to the specifying accepted by said accepting means.

The broadcast receiver of the present invention displays receivable carrier frequencies searched by broadcast station searching means as the list of broadcast station information, directory accepts specifying of any of out of the listed, and receives the broadcast corresponding to accepted specifying.

Also, a broadcast receiver of the present invention comprises: broadcast receiving means for receiving a broadcast; broadcast station searching means for searching a carrier frequency of a broadcast station receivable by said broadcast receiving means; and a display section, the receiver further comprising: a broadcast station information table previously storing carrier frequencies allotted to a plurality of broadcast stations, and attached information related to the broadcast station correspondingly to each carrier frequency; display controlling means for reading the attached information stored in said broadcast station information table correspondingly to a receivable carrier frequency searched by said broadcast station searching means, and displaying them on said display section as a list of broadcast station information; accepting means for accepting specifying of any one out of the list of the broadcast station information displayed on said display section; and receiving controlling means for making said broadcast receiving means receive the broadcast of the carrier frequency corresponding to the specifying accepted by said accepting means.

The broadcast receiver of the present invention reads attached information stored in a broadcast station information table correspondingly to the receivable carrier frequency searched by the broadcast searching means and displays as the list of broadcast information, and directly accepts specifying any one out of the list and receives the broadcast corresponding to the specifying.

Also, in the broadcast receiver of the present invention according to the above-described invention, said attached information includes at least one of a name, a nickname, and a genre of broadcast content of the broadcast station.

The broadcast receiver of the present invention according to the above-described invention displays the information of the name, the nickname and a genre of broadcast contents of the broadcast station accompanying with the list of the broadcast station information.

Also, in the broadcast receiver of the present invention according to any one of the above-described inventions, a plurality of said broadcast station information tables are provided for each region, said accepting means accepts regional specifying, and said display controlling means reads the attached information stored in the broadcast station information table of the region corresponding to the regional specifying accepted by said accepting means, and displays it on said display section as the list of the broadcast station information.

The broadcast receiver of the present invention according to any one of the above-described inventions, first, accepts a regional specifying, and displays the attached information stored in the broadcast station information table of the region corresponding to the accepted regional specifying accompanying with the list of the broadcast station information.

Also, the broadcast receiver of the present invention according to any one of the above-described invention, further comprises: content information receiving means for receiving content information related to a content of the broadcast being received by said broadcast receiving means under a control of said receiving controlling means; record controlling means for recording in a recording medium data of the content of the broadcast received by said broadcast receiving means and the content information related to the content received by said content information receiving means correspondingly with each other; and reproducing means for reading and reproducing the data of the content recorded in said recording medium; wherein said display controlling means reads the content information recorded in said recording medium from said recording medium and displays them on said display section as the list of the content, said accepting means accepts specifying of any one out of the list of the content displayed on said display section, and said reproducing means reads and reproduces the data of the content stored in said recording medium correspondingly to the specifying accepted by said accepting means.

The broadcast receiver of the present invention according to any one of the above-described invention receives the content and the content information related to each content from any one of the searched receivable broadcast stations and records in the recording medium, displays the content information related to each content as the list, and reproduces the content specified therefrom.

The broadcast receiver of the present invention according to the above-described invention further comprises: communicating means capable of communicating with an external computer, wherein said record controlling means records in said recording medium the data of the content included in the information received from the external computer by said communicating means and the content information related to the content correspondingly with each other.

The broadcast receiver of the present invention according to the above-described invention downloads, in addition to the content from the received broadcast, also the content from the external computer, and records in the recording medium.

The broadcast receiver of the present invention according to the above-described invention further comprises: encoding means for compressively encoding the data of the content received from the external computer by said communicating means; and decoding means for decoding the data compressively encoded by said encoding means; wherein said accepting means accepts a selection whether or not the data of the content received from the external computer by said communicating means is compressively encoded by said encoding means, said record controlling means makes said encoding means compressively encode the data of the content received from the external computer by said communicating means and records it in said recording medium, when said accepting means accepts a selection of compressively encoding, and said reproducing means makes said decoding means decode the data, when reproducing the data of the content compressively encoded and recorded in said recording medium.

The broadcast receiver of the present invention according to the above-described invention accepts a selection whether or not a compressive encoding is performed is accepted, and in accordance with this selection, for example, compressively encodes the data of the content received by communicating means from the external computer and records in the recording medium.

The broadcast receiver of the present invention according to any one of the above-described invention further comprises: extracting condition accepting means for accepting a condition for extracting the content information recorded in said recording medium; and extracting means for extracting the content information recorded in said recording medium, in accordance with the condition accepted by said extracting condition accepting means; wherein said display controlling means reads the content information extracted from the recording medium by said extracting means and makes said display section display the extracted content information as a list of the content, said accepting means accepts specifying of any one out of the content information displayed on said display section, and said reproducing means reproduces the content stored in said recording medium correspondingly to the specifying accepted by said accepting means.

The broadcast receiver of the present invention according to any one of the above-described invention extracts the content received by the computer and the content information of the content received by the broadcast from the recording medium in accordance with an accepted condition and displays as the list, and accepts any one out of the list and reproduces corresponding content.

In the broadcast receiver of the present invention according to any one of the above-described invention, said content is a music, and said content information includes at least one of a genre, music title, a performer, and an author of the music, which is the corresponding content.

The broadcast receiver of the present invention according to any one of the above-described invention displays as the list at least one of the genre, music title, performer, and author, which are the contents corresponding to each content information.

In the broadcast receiver of the present invention according to any one of the above-described invention, said record controlling means records in said recording medium data of the content of a broadcast received by said broadcast receiving means and the content information related to the content received by said content information receiving means, and in addition, attached information stored correspondingly to the received broadcast station in said broadcast station information table correspondingly with each other, and said extracting means rearranges and extracts the content information recorded in said recording medium, in accordance with the presence/absence of the attached information, the content of the attached information, or the content of the content information.

In the broadcast receiver of the present invention according to any one of the above-described invention makes the content be recognizable whether or not the content is received by broadcast, or whether or not the content is downloaded from the computer, by extracting and rearranging the content information recorded in the recording medium in accordance with the presence or absence of the attached information, the content of the attached information, or the content of the content information.

In the broadcast receiver of the present invention according to any one of the above-described invention, said communicating means is capable of receiving from the external computer the information in which a carrier wave frequency allotted to each of a plurality of broadcast stations and the attached information of the broadcast station are corresponded with each other; and said broadcast station information table is made to be updated the storage content based on the information received from the external computer by said communicating means.

The broadcast receiver of the present invention according to any one of the above-described invention updates a storage content of the broadcast station information table received from, for example, the external computer.

The broadcast receiver of the present invention according to any one of the above-described invention further comprises: timer means for clocking time, wherein said accepting means accepts specifying of any one out of the list of the broadcast station information displayed on said display section, start time of recording the content and content information by receiving the broadcast of the carrier frequency corresponding to the accepted specifying, and end time of recording or recording time period, said broadcast receiving means receives the broadcast in accordance with clocking of said timer means, and in accordance with the broadcast station information accepted by said accepting means, the start time of recording, and the end time of recording or the recording time thereof, and said record controlling means records in said recording medium the broadcast received by said broadcast receiving means in accordance with clocking of said timer means, and in accordance with the broadcast station information accepted by said accepting means, the start time of recording, the end time of recording or the recording time period thereof.

The broadcast receiver of the present invention according to any one of the above-described invention accepts specifying of any one out of the list of the broadcast station information displayed on a display section, a start time of recording in the recording medium the content of the broadcast and the content information obtained by receiving the broadcast of the carrier frequency corresponding to the accepted specifying, and an end time of recording or a recording time period thereof, and receives the broadcast in accordance with the accepted broadcast information, the start time of recording, and the end time of recording or recording time period thereof and records in the recording medium.

In broadcast receiver of the present invention according to the above-described invention, said display controlling means displays on said display section the broadcast station information, the start time of recording of the content of the broadcast and the content information in said recording medium, and the end time of recording or the recording time period, accepted by said accepting means.

In the broadcast receiver of the present invention according to the above-described invention displays on the display section the accepted broadcast station information, the start time of recording the content of the broadcast and the content information in the recording medium, and the end time of recording or the recording time period.

In the broadcast receiver of the present invention according to any one of the above-described invention, said broadcast station searching means searches a carrier frequency band received by said broadcast receiving means and determines that the carrier frequency whose receiving level is detected to be a predetermined threshold value or more is the carrier frequency of the broadcast station; and said display controlling means displays the receiving level detected by said broadcast searching means corresponding to the list of the broadcast station information displayed on said display section.

The broadcast receiver of the present invention according to any one of the above-described invention displays a receiving level detected correspondingly to each of the broadcast information listed on the display section.

According to the broadcast receiver of the present invention, receivable carrier frequencies searched by the broadcast station searching means can be received by directly specifying any one of the broadcast information. Therefore, limitation in the number of the broadcast stations that can be preset is substantially eliminated.

In addition, according to the broadcast receiver of the present invention, the receivable carrier frequencies searched by the broadcast station searching means can be received by directly specifying any one of the attached information stored in the broadcast station information table correspondingly to the aforementioned carrier frequencies. Therefore, limitation in the number of the broadcast stations that can be preset is substantially eliminated.

Also, according to the broadcast receiver of the present invention, as the attached information, the information such as the name, nickname, and the genre of the broadcast content of the broadcast station is displayed accompanying as the list of the broadcast station information. Therefore, it becomes possible to select the broadcast station not simply by the frequency, but by the name, nickname, and the content of the broadcast, etc.

Further, in the broadcast receiver of the present invention according to the above-described both inventions, search is performed by limiting the set region. Therefore, when the device is moved, the broadcast station information is displayed as the list corresponding to the region of the moving destination.

Also, in the broadcast receiver of the present invention according to any one of the above-described invention, it is possible to receive the broadcast and store the broadcast content and the content information related to each content, and the content information thus obtained is displayed as the list. Therefore, it becomes possible to reproduce the content after details of the content are confirmed.

Further, in the broadcast receiver of the present invention according to the above-described invention, in addition to the content from the received broadcast, it becomes possible to record and reproduce the content downloaded from the external computer.

In addition, in the broadcast receiver according to the above-described invention, in accordance with placing importance on a reproducing quality, or placing importance on a storage capacity, it is possible to select whether or not the data of the content received from the external computer by the communicating means is compressively encoded.

Further, in the broadcast receiver of the present invention according to the above-described each invention, the content information of either one of the content received from the computer or the content received by broadcast can be extracted and displayed as the list, in accordance with an accepted condition.

In the broadcast receiver of the present invention according to the above-described each invention, classification is possible by the genre, music title, performer, and author as content information, which are the contents corresponding to each content information recorded in the recording medium, and can be reproduced after the details of the content are confirmed.

Further, in the broadcast receiver of the present invention according to the above-described both inventions, the content information recorded in the recording medium is rearranged and extracted in accordance with the presence/absence of the attached information, the details of the attached information, or the details of the content information corresponding to the broadcast station. Therefore, it becomes easily recognizable whether the content is received from the broadcasting, or the content is downloaded from the computer.

Further, in the broadcast receiver of the present invention according to the above-described each invention, the storage content of the broadcast station information table is updated by the information received from, for example, the external computer. Therefore, when a new broadcast station is opened, the content of the broadcast station information table can be immediately corresponded to a newest state.

Further, in the broadcast receiver of the present invention according to the above-described each invention, the broadcast is received and recorded in the recording medium in accordance with the broadcast station information, the start time of recording, the end time of recording or recording time period thereof accepted by accepting means. Namely, a so-called reserved sound (reserved picture) recording is possible.

Further, in the broadcast receiver of the present invention according to the above-described invention, the setting of the so-called reserved sound (reserved picture) recording is displayed on the display section. Therefore, a reservation state can be easily confirmed.

Further, in the broadcast receiver of the present invention according to the above-described invention, the receiving level detected corresponding to each broadcast station information list is displayed on the display section. Therefore, a degree of freedom in selection is increased, such that only the broadcast station of relatively high receiving level can be selected.

The above and further objects and features of the invention will more fully be apparent from the following detailed description with accompanying drawings.

BRIEF DESCRIPTION OF THE DRAWINGS

FIG. 5A and FIG. 5B are schematic views showing storage contents of a broadcast information table of the broadcast receiver according to the present invention;

DETAILED DESCRIPTION OF THE INVENTION

Figure 1:
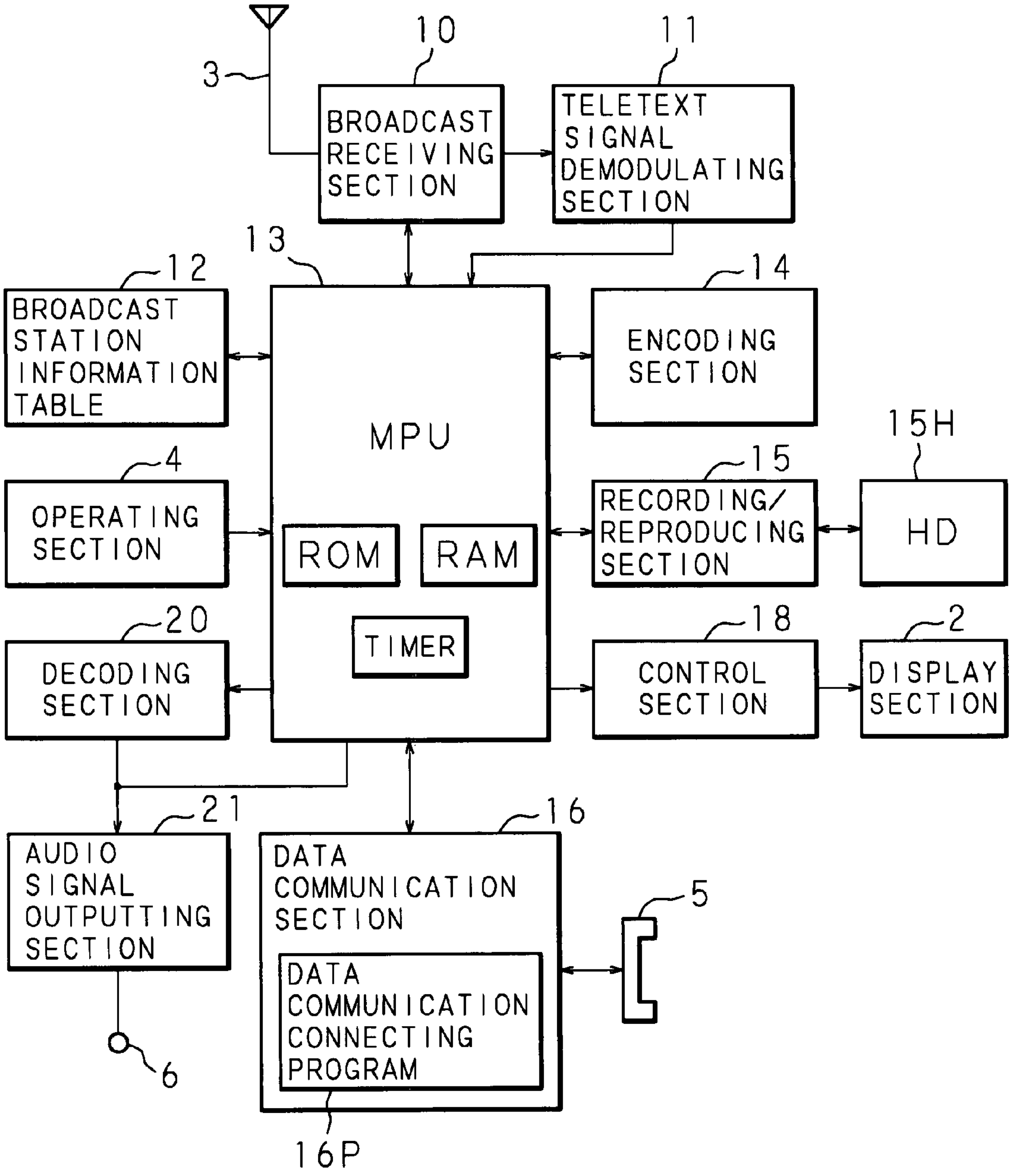
FIG. 1 is a block diagram showing an example of an internal configuration of a broadcast receiver according to the present invention.
Figure 2:
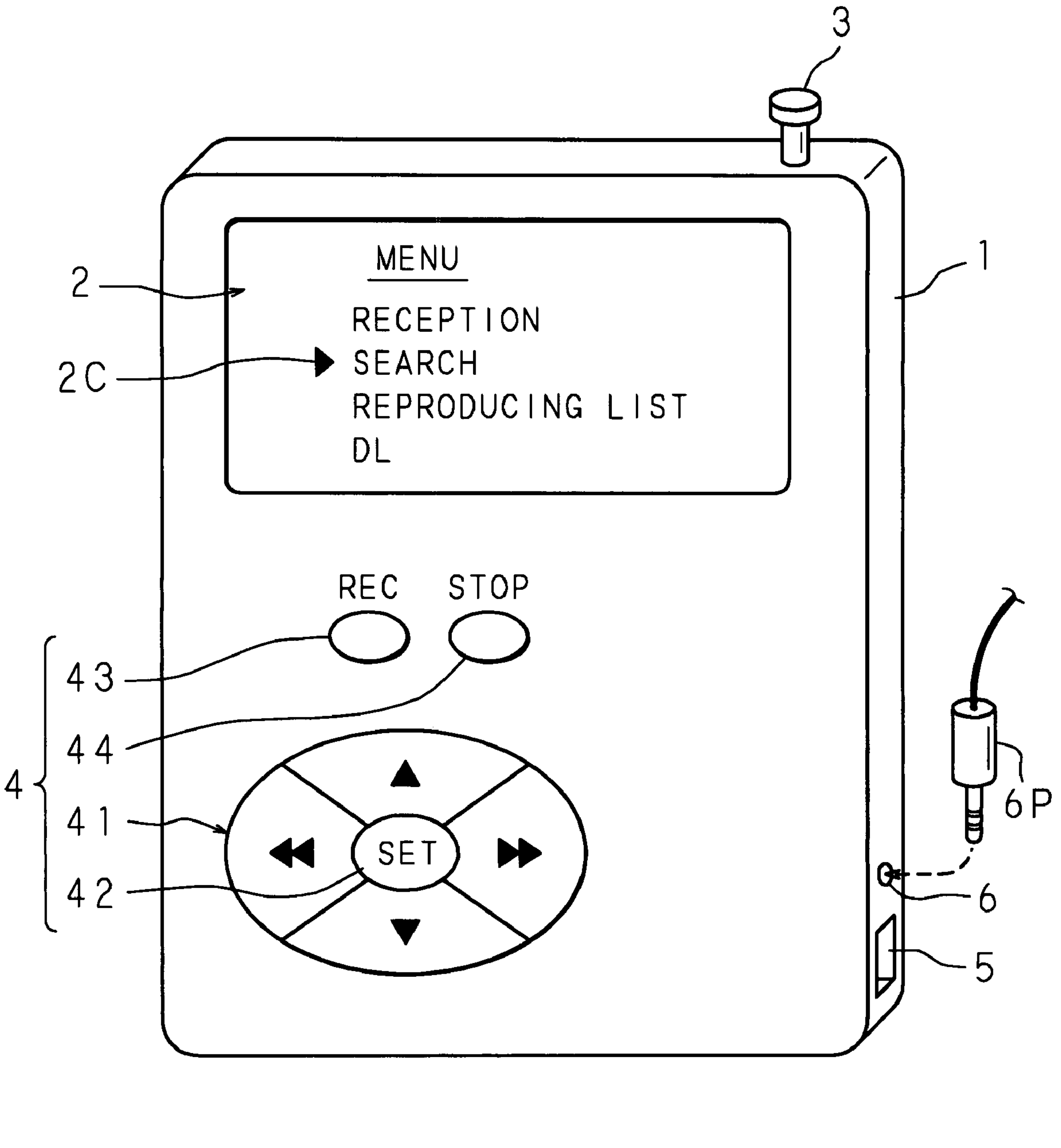
FIG. 2 is a schematic view showing an external appearance of the broadcast receiver according to the present invention.

Embodiments of the present invention will be specifically explained hereunder, with reference to the drawings. FIG. 1 is a block diagram showing an internal configuration of a broadcast receiver according to the present invention, and FIG. 2 is a schematic view showing an external appearance of the broadcast receiver according to the present invention. Note that in an explanation given hereunder, the explanation will be given on the assumption that contents recorded/reproduced by the broadcast receiver of the present invention is contents of music, namely, music data. However, of course, image data such as still pictures and animations may be processed as contents.

In FIG. 2, the broadcast receiver according to the present invention is constituted in a casing 1 having an approximately rectangular shape. Inside the casing 1, an antenna 3 protruded outward for receiving a broadcast; a display section 2 using a liquid crystal panel, etc, for reporting a guide for supporting an operation, reception information/reception data, etc, to a user; an operating section 4 having various operating buttons operated by a user for inputting an instruction; a slot 5 for data communication; and a headphone jack 6 for connecting a headphone (or earphone), and so forth are provided. Note that when the headphone is connected to the headphone jack 6, a plug 6P connected to the headphone is plugged into the headphone jack 6.

The slot 5 for data communication is a slot for connecting a USB cable, etc, for example, and is connected with a data communication section 16 as will be described later in the casing 1. Also, it is possible to connect a speaker of active drive type, for example, to the headphone jack 6. In addition, of course it is also possible to configure the data communication section 16 so as to directly communicate with the Internet, and in this case, a modem or a terminal adapter, etc, are connected to the slot 5.

The operating section 4 has a "REC" button 43 by which a user instructs recording (contents, namely, recording of the music data); a "STOP" button 44 by which the user instructs stop recording or reproduction; a cursor key 41 for moving a cursor 2C in up/down and right/left directions on the display section 2; and a "SET" button 42 for executing an operation instructed by the cursor 2C in accordance with an instruction given by the user, and so forth. In addition, FIG. 2 shows a state in which a menu screen is displayed on the display section 2. In this menu screen, as will be described later in detail, "receive broadcast", "search broadcast station", "reproduction list", and "download" can be selected. In addition, in a case where the display section 2 is formed in a touch panel system, each kind of button and key of the operation section 4 can be reduced, to make it easy to operate for the user.

Note that in an explanation given hereunder for the broadcast receiver according to the present invention, a broadcast content means a content (music data) obtained by receiving the broadcast. Also, content information means various kinds of information attached to the music data obtained by a teletext signal (teletext data), for example, (such as a genre of the music, music title, a performer, and an author, etc, and information related to the broadcast station from which the content is received). A downloaded content means music data received, namely, downloaded from the computer through a data communication section 5, and the content information in this case means various kinds of information attached to the music data (such as genre of the music, music title, performer, and author). Accordingly, the content information of the downloaded content does not include the information related to the broadcast station.

The reason for differentiating between the broadcast content and the downloaded content is as follows. Namely, since there are an analogue broadcast and a digital broadcast in the broadcast, the music data, which is the broadcast content obtained by receiving the broadcast, also includes analogue data and digital data, and therefore the broadcast content includes both of them. Meanwhile, downloaded contents received from the data communication section 5 are totally digital contents. In order to clarify the aforementioned different point, the broadcast content is thus distinguished from the downloaded content. Note that the music data of an analogue signal at the time of receiving an analogue broadcast is also digitally converted after being inputted to the broadcast receiver of the present invention and is treated as the digital data.

Next, with reference to the block diagram of FIG. 1, a specific internal configuration and each basic function (operation) of the broadcast receiver of the present invention will be simply explained.

The broadcast receiver of the present invention comprises a broadcast receiving section 10 including a tuner connected to the antenna 3 for receiving the broadcast and a search circuit for detecting the broadcast to be performed when an electric field strength of a carrier frequency shows a predetermined value or more, and then selecting a channel (searching a channel); a broadcast station information table 12 for referencing information related to the carrier frequency when the broadcast station is detected by the search circuit of the broadcast receiver 10; a teletext signal demodulating section 11 for demodulating a teletext signal when it is included in a signal received by the broadcast receiving section 10; an encoding section 14 for compressively encoding the music data under an instruction by a user (by an operation of an operating section 4); a recording/reproducing section 15 for recording encoded data and raw data (non-compressively processed data) in an HD 15H, which is a recording medium, and reading and reproducing the data recorded in the HD 15H; a data communication section 16 including a data communication connecting program 16P installed therein for transmitting/receiving the data between the data communication section 16 and a computer; a display control section 18 for controlling a display on the aforementioned display section 2; a decoding section 20 for expansively decoding (when music data is compressively encoded) the music data selected by the user and read (reproduced) from the HD 15H in accordance with the display on the display section 2; an audio signal outputting section 21 for converting and amplifying into an analogue signal the decoded music data or the music data not originally compressed and outputting it as an audio signal; an operating section 4 for accepting the instruction from the user; and an MPU 13 for controlling each aforementioned operation in accordance with the instruction from the operating section 4.

The MPU 13 incorporates an RAM, an ROM, and a timer. In the ROM, a control program in which a processing procedure for a control by the MPU 13 is recorded is previously installed. The RAM is used for storing temporary data associated with various processing by the MPU 13. In addition, the timer clocks an absolute time, and performs a time display on the display section 2 as needed, and is also used in reservation of the reception of the broadcast and audio recording (recording of the contents) of the broadcast received by reservation. Note that when the analogue broadcasting is received, the MPU 13 converts it into the digital data regardless of the instruction by the user, and directly outputs it to the encoding section 14 or recording/reproducing section 15.

In addition, the music data received from the computer is also recorded in the HD 15H by the aforementioned recording/reproducing section 15, and is read from the HD 15H (reproduced). Further, the aforementioned headphone jack 6 is connected to the audio signal outputting section 21. It is desirable to use a nonvolatile memory such as a flash memory in the broadcast station information table 12. However, the broadcast station information table 12 can also be stored in a suitable storage area of the HD 15H.

Next, the operation of the aforementioned broadcast receiver of the present invention will be explained with reference to a schematic view showing a display state of the display section 2 and a flowchart showing the processing procedure of the MPU 13.

[Processing Procedure of a Broadcast Station Search Mode]

The explanation will be given on the assumption that there are an FM broadcasting (analogue broadcasting) and one segment broadcasting (digital broadcasting) for a portable terminal of a digital terrestrial broadcasting. However, although the broadcast receiver of the present invention can respond to either of or both of the FM broadcasting or/and the digital broadcasting, a case of searching the FM broadcasting will be given as an example in the explanation hereunder.

In a case of the FM broadcasting, a frequency (carrier frequency) is respectively individually allotted to each broadcast station by the Ministry of Internal Affairs and Communications in Japan. In the US, each broadcast station is specialized for specially broadcasting music and news, and so forth. For example, in the FM broadcast station for specially broadcasting music, a music type (genre) is further sub-divided and specialized into genres such as classical music, jazz, rock, and country and western music, and the broadcast station for specially broadcasting jazz broadcasts only jazz (this type of broadcast station is referred to as a special station hereafter). Even in a case of the broadcast station for specially broadcasting news, a news type is further sub-divided and specialized into genres such as sports news and stock news in many cases.

Figure 3:
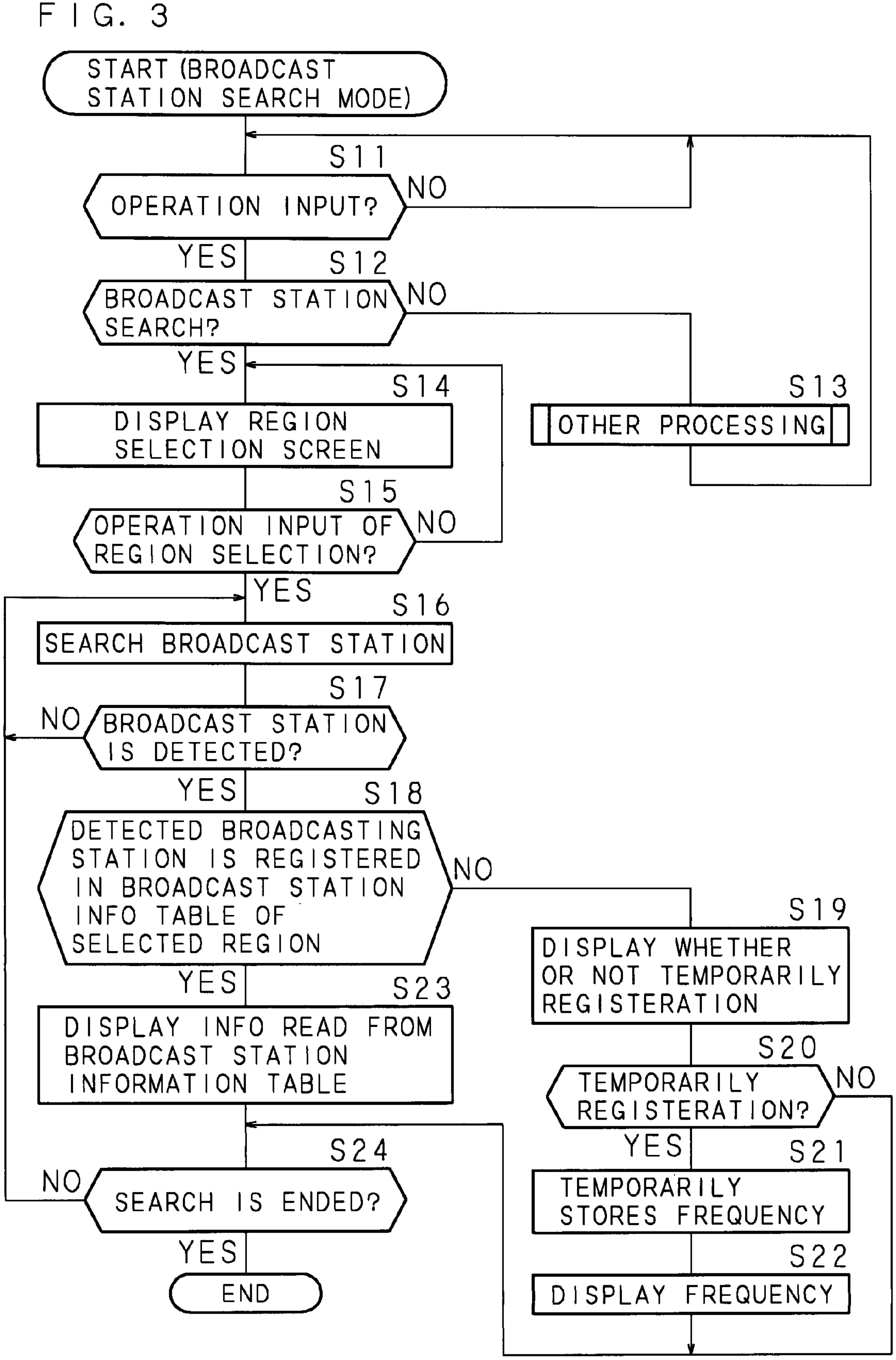
FIG. 3 is a flowchart showing a processing procedure by an MPU in searching a broadcast station (broadcast search mode) of the broadcast receiver according to the present invention.

First, an explanation will be given to the processing procedure by the MPU 13 when the broadcast station is searched (broadcast search mode), with reference to the flowchart of FIG. 3. In this case, a user selects "broadcast station search" from the menu screen displayed on the display section 2 as shown in FIG. 2 by operating the cursor key 41 of the operating section 4, thereby moving a cursor 2S, and determines the broadcast station by operating the "SET" button 42.

In a state of displaying the menu screen, the MPU 13 stands-by an operation input by the user (NO in step S11). When the user performs the operation input (YES in step S11) as described above, and this is the instruction other than the "broadcast station search" (NO in step S12), other processing corresponding to the operation thus instructed is executed (step S13), and the processing is returned to the step S11.

Figure 4:
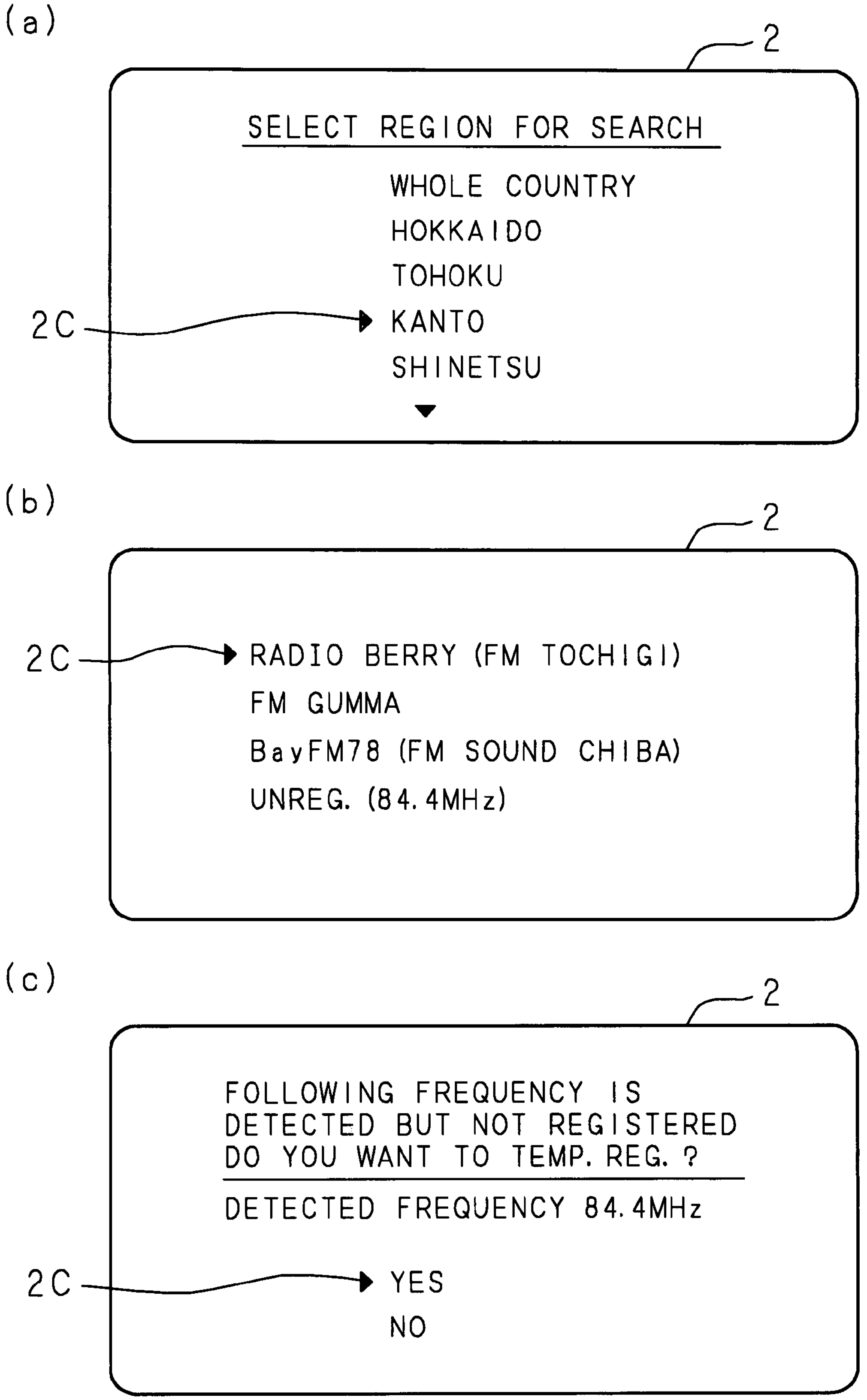
FIG. 4A, FIG. 4B and FIG. 4C are schematic views showing display states on a display section in searching the broadcast station (broadcast search mode) of the broadcast receiver according to the present invention.

When the operation input is the "broadcast search" (YES in step S12), next, the MPU 13 controls the display control section 18 to display an "region selection screen" as shown in FIG. 4A on the display section 2 (step S14). Meanwhile, FIG. 5A and FIG. 5B are schematic views showing storage contents of the broadcast station information table 12. The broadcast station information table 12 is, as shown in FIG. 5A, generally divided by located regions such as "HOKKAIDO", "TOHOKU", "KANTO", or the like. Then, as shown in FIG. 5B, "station name", "nickname (having no nickname in some cases)", "carrier frequency", and "genre" of each broadcast station is registered for each region. The "carrier frequency" of a so-called satellite station is also registered, and the "genre" is not registered when there is no particular genre. Note that for example, in the US, most of the broadcast stations are further sub-divided into the genres such as "classical music", "jazz", "rock", "tango", and "dance music", in the genre of the music, and the genre of the news are further sub-divided into "stock", "sports", and "international news".

The MPU 13 performs display as shown in the schematic view of FIG. 4A on the screen of the display section 2, and stands-by the operation input by the user (NO in step S15). Then, when the user selects any one of the regions by operating the operation section 4 (YES in step S15), the MPU 13 sends a control signal for searching the carrier frequency to the broadcast receiving section 10, thereby starting a search of a frequency band allotted to the FM broadcast stations from a lower limit side to an upper limit side of the frequency (step S16). Note that the search of the frequency band is performed by unit of 0.1 MHz over an entire area of the frequency that can be allotted to the FM broadcast station. For example, in Japan, the search of the frequency is performed in a range of 76.0 to 108 MHz (although the FM broadcast station itself has the frequency band of 76.0 to 89.9 MHz, 1 to 3 channels of TV broadcasting is included). When the broadcast station performs broadcasting, in other words, when a radio wave of the carrier frequency is transmitted, the carrier frequency of a predetermined electric field value or more can be detected. Therefore, by previously setting a threshold value of the electric field value of the detected carrier frequency, whether the frequency is an external noise or the carrier frequency transmitted from the broadcast station can be discriminated.

When the carrier frequency transmitted from the broadcast station is detected (YES in step S17), the MPU 13 searches the broadcast station information table 12 corresponding to the previously selected region of the broadcast station information table 12, and determines whether or not the detected carrier frequency is already registered (step S18). When the detected frequency is registered in the broadcast station information table 12 (YES in step S18), the MPU 13 reads the contents, namely, the broadcast station name, nickname (abbreviated name), and genre of the broadcast content, etc, registered in the broadcast station information table 12, and as shown in FIG. 4B, displays them on the display section 2 (step S23) by controlling the display control section 18.

Meanwhile, in step S18, when the detected frequency is not registered (NO in step S18), the MPU 13 displays on the display section 2 a message as shown in FIG. 4C urging whether or not the broadcast station of this frequency is temporarily registered (step S19). In accordance with this message, when the user gives an instruction to temporarily register the broadcast station of this frequency by operating the operating section 4 (YES in step S20), the MPU 13 temporarily stores this frequency in the RAM and, as shown in FIG. 4B, displays on the displays section 2 as an unknown broadcast station (steps S21 and S22), and the processing is advanced to step S24 as will be described later. Meanwhile, when the user gives an instruction not to temporarily register this frequency (NO in step S20), the processing is advanced to step S24 without performing the aforementioned processing by the MPU 13.

The MPU 13 determines whether or not the search of the broadcast station is ended (step S24), after the processing of the aforementioned step S23, when the aforementioned step S20 shows NO, and after the processing of the step S22. Specifically, the MPU 13 can so determined, depending on whether or not the search of the frequency by the search circuit of the broadcast receiving section 10 reaches the upper limit of the frequency of the FM broadcasting. When the search of the frequency by the search circuit of the broadcast receiving section 10 does not end (NO in step S24), the processing is returned to the step S16, and the MPU 13 continues the search of the broadcast station in the same way as described above. Meanwhile, when the search of the frequency by the search circuit of the broadcast receiving section 10 ends (YES in step S24), the MPU 13 ends the processing of the "broadcast station search mode". Note that at this time, when a search result is recorded in the HD 15H, this search result can be displayed on the display section 2 later.

As described above, the result searched by the broadcast station search mode is displayed as a receivable broadcast station list on the display section 2 as shown in the schematic view of FIG. 4C. Accordingly, the user can select the broadcast station by observing the display of this display section 2 (broadcast receiving mode). When the user performs an operation for selecting and specifying the "broadcast receiving" out of a displayed content in the menu screen on the display section 2 as shown in FIG. 2, the search result is displayed on the display section 2 when it is recorded in the HD 15H, namely, a proximate result of the "broadcast station search" performed by the user as described above is displayed on the display section 2. Namely, when the user specifies the "broadcast receiving" in the menu screen displayed on the display section 2, a mode of the "broadcast receiving" is available after once performing the "broadcast station search", without performing the "broadcast station search" again. The "broadcast station search" is performed for searching the receivable broadcast station, for example at the time of initial setting, when a new broadcast station is opened, or at a moving destination when the user moves to the outside of his/her normal behavior due to a trip, traveling, etc. This point is similar to a case of a car audio, for example.

When there is no broadcast station information table 12 provided, or when the content is not registered even if the broadcast station information table 12 is provided, only the receivable frequency is displayed on the displays section 2 as the search result. In this case also, when the information such as broadcast station name and nickname can be acquired by the teletext broadcasting, they are displayed on the display section 2.

[Processing Procedure of Broadcast Receiving Mode]

Figure 6:
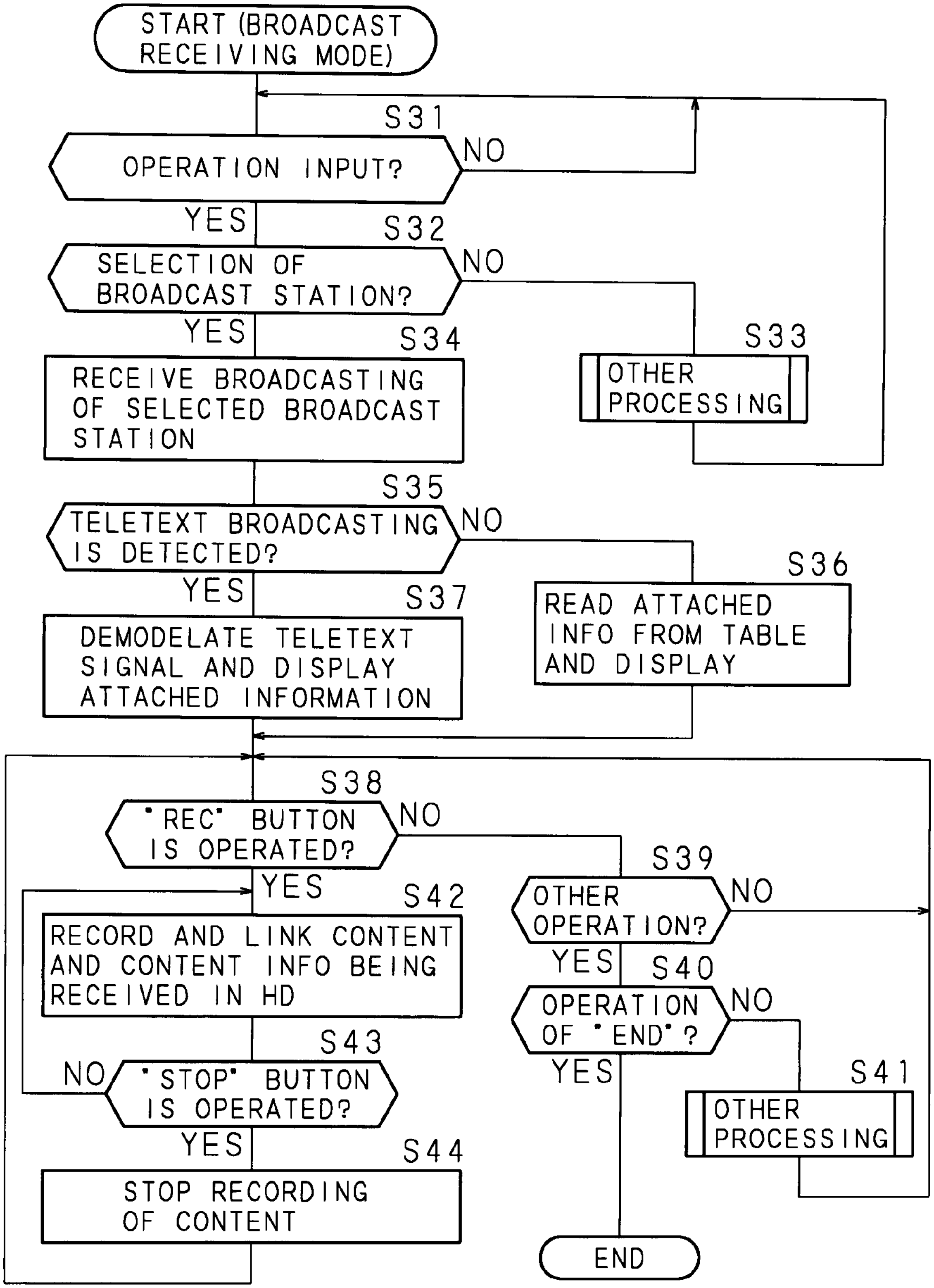
FIG. 6 is a flowchart showing the processing procedure by the MPU for receiving a broadcast (broadcast receiving mode) of the broadcast receiver according to the present invention.

An explanation will be given to a processing procedure by the MPU 13 in a case of receiving the broadcast (broadcast receiving mode), with reference to the flowchart of FIG. 6. The selection of the broadcast station is executed when the user selects the "broadcast receiving" in the menu screen displayed on the display section 2 as shown in the schematic view of FIG. 2 by operating the operating section 4. In this case, a list of the broadcast station, which is searched while proximately performing the "broadcast station search" as described above, is displayed on the display section 2. Accordingly, when the user operates the cursor key 41 to a display position of the broadcast station desired to listen out of the receivable broadcast station list displayed on the display section 2, moves the cursor (shown by a rightward directed Δ in FIG. 4C), and operates the "SET" button 42, then, the broadcast station to receive is determined. Note that when the display section 2 is configured by a touch panel, the operation by touching with user's fingertips is possible.

Namely, the MPU 13 monitors the presence/absence of the operation input under a state where the menu screen is displayed (NO in step S31), and when there is an operation input (YES in step S31), the MPU 13 determines whether or not this operation input is a selective operation of the broadcast station (step S32). When there is the operation input other than the selective operation of the broadcast station (NO in step S32), the MPU 13 executes other processing in accordance with the operation input (step S33), and the processing is returned to the step S31. When there is the operation input (YES in step S32), the MPU 13 makes the broadcast receiving section 10 receive the broadcasting of the selected broadcast station (step S34), and determines whether or not this broadcasting is the teletext broadcasting (step S35).

When the broadcasting being received is not the teletext broadcasting (NO in step S35), the MPU 13 reads the attached information of the selected broadcast station (broadcast station being received) from the broadcast station information table 12, and displays it on the display section 2 under the control of the display control section 18 (step S36). On the other hand, when the broadcasting being received is the teletext broadcasting (YES in step S35), the MPU 13 makes the teletext signal demodulating section 11 demodulate the broadcasting being received, thereby converting the attached information of the broadcast station being received and the content information (such as music title) of the content being received into character information, and displays it on the display section 2 under the control of the display control section 18 as shown in the schematic view of FIG. 7 (step S37).

Figure 7:
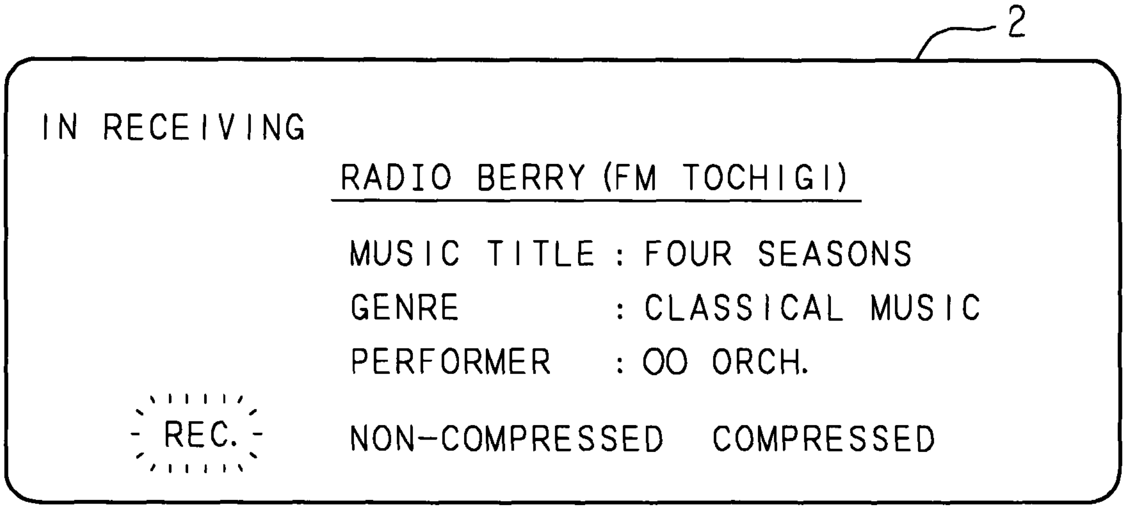
FIG. 7 is a schematic view showing a display state on the display section for receiving the broadcast (broadcast receiving mode) of the broadcast receiver according to the present invention.

In this way, when the user selects the broadcast station ("RADIO BERRY (FM TOCHIGI)" in an example shown in FIG. 7), the information (content information) related to the music currently broadcasted by the "RADIO BERRY (FM TOCHIGI)" is displayed on the display section 2. In FIG. 7, the "RADIO BERRY (FM TOCHIGI)" is the name of the FM broadcast station, reception of which is selected by the user, wherein the music title "four seasons" as the content information, the "classical music" as the genre of the music, and "OO orchestra" as the performer, are respectively displayed. However, when the user selects an unknown broadcast station not registered in the broadcast station information table 12 and not performing the teletext broadcasting, the name of the broadcast station and the attached information (such as a nickname of the broadcast station) are not displayed. Also, when the user selects the broadcast station not performing the teletext broadcasting, the attached information on the individual music can not be obtained, irrespective of whether or not this broadcast station is registered in the broadcast station information table 12, and therefore such attached information is not displayed either.

Here, when the data (music data) on the music received at this time point is compressed (in a case of the digital broadcasting), the compressed data is subjected to decoding processing in the decoding section 20 under the control of the MPU 13. Thereafter, the decoded data is given to the audio signal outputting section 21, D/A-converted and amplified, and outputted to the outside as the audio signal of analogue from the headphone jack 6.

A character display such as "recording" displayed on the lower left side of FIG. 7 shows that the music data being received at present is being recorded (during recording) in the HD 15H by the recording/reproducing section 15. In order to record the music data being received in the broadcast, the user has only to operate a "REC" button 43, and in order to stop the recording (audio recording), the user has only to operate a "STOP" button 44. At this time, the data recorded in the HD 15H by the recording/reproducing section 15 is obtained by linking the content itself, which is at least the music data, and the content information attached thereto such as music title, genre, and so forth.

Specifically, the processing by the MPU 13 as described hereunder is performed. As shown in FIG. 7, in a state that the information related to the music (broadcast content) being received at present is displayed on the display section 2 as shown in FIG. 7, the MPU 13 monitors whether or not the user operates the "REC" button 43 (step S38). When the "REC" button 43 is not operated (NO in step S38), the MPU 13 monitors whether or not other operation is performed (step S39), and when no operation is performed (NO in step S39), the MPU 13 makes the processing return to the step S38. When the operation of "end" or the operation such as turning off a power source is performed as other operation (YES in step S39, and YES in S40), the MPU 13 ends a series of the processing and becomes in a non-operation state. However, when other operation is performed (NO in step S40), the MPU 13 executes other processing corresponding to the performed operation (step S41).

Meanwhile, when the "REC" button 43 is operated (YES in step S38), the MPU 13 controls the recording/reproducing section 15 to convert the music data being received at this time point into the digital data as needed, then, links the digital data thus obtained and the content information obtained by the teletext broadcasting, and records them in the HD 15H (step S42). Thereafter, the MPU 13 monitors whether or not the "STOP" button 44 is operated (NO in step S43), and when the "STOP" button 44 is operated (YES in step S43), the MPU 13 controls the recording/reproducing section 15 to stop the recording of the music data to the HD 15H (step S44).

Note that as shown in FIG. 7, the display section 2 displays both of "non-compression" and "compression" in the aforementioned processing. Therefore, when the user specifies the "compression" by operating the cursor key 41 and the "SET" button 42, the music data being received is compressively encoded and recorded in the HD 15H, at recording of the music data to the HD 15H at step 42. Meanwhile, when the user specifies the "non-compression", the music data being received is not compressed and is recorded in the HD 15H as it is, at recording of the music data to the HD 15H at step 42.

In the "broadcast receiving mode" as described above, the user can listen to the broadcasting and also can record the music data, which is the broadcast content, by linking this music data and the attached information such as a music title.

[Processing Procedure of Data Communication Mode]

Figure 8:
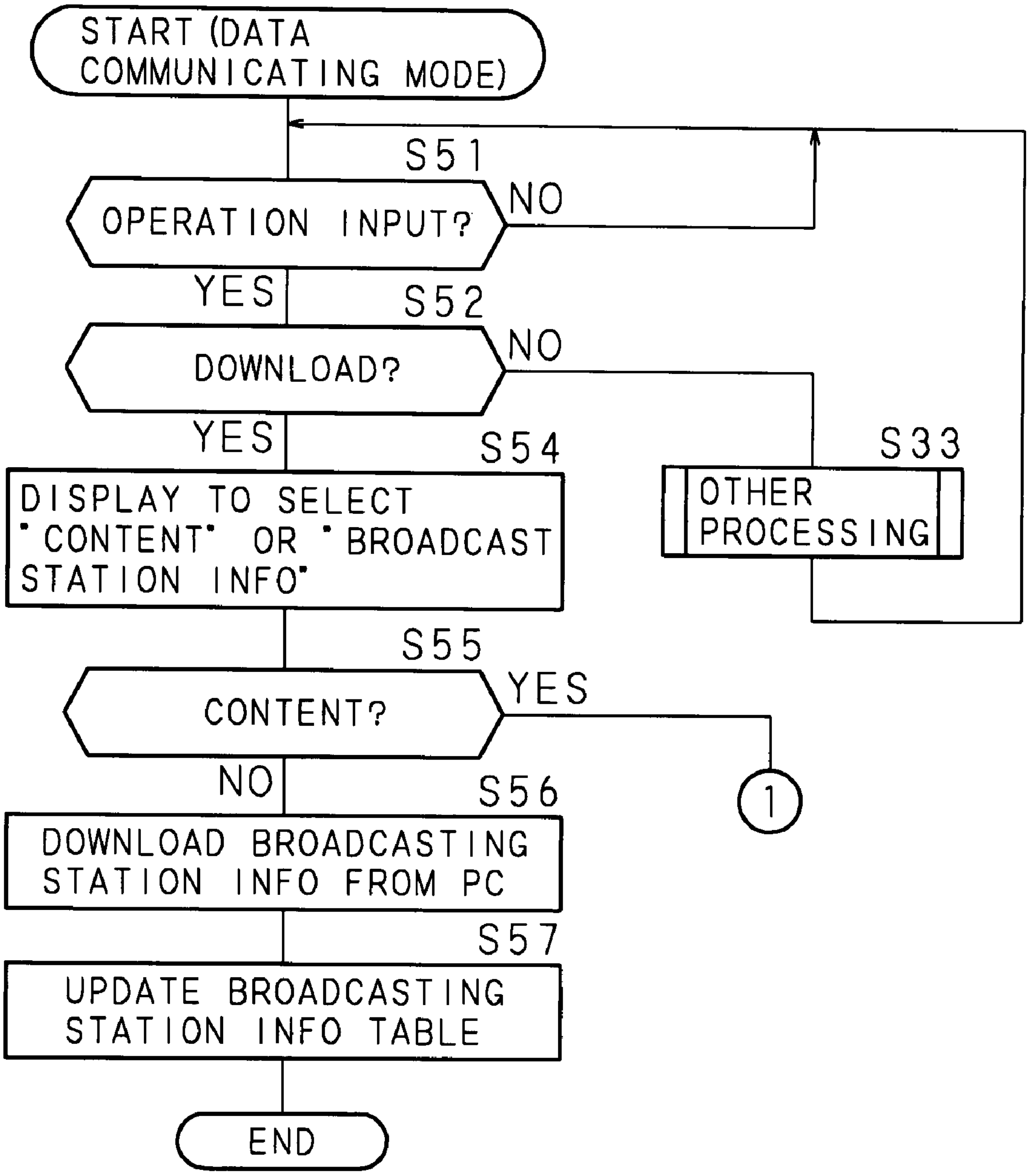
FIG. 8 is a flowchart showing the processing procedure by the MPU of a data communication mode of the broadcast receiver according to the present invention.
Figure 9:
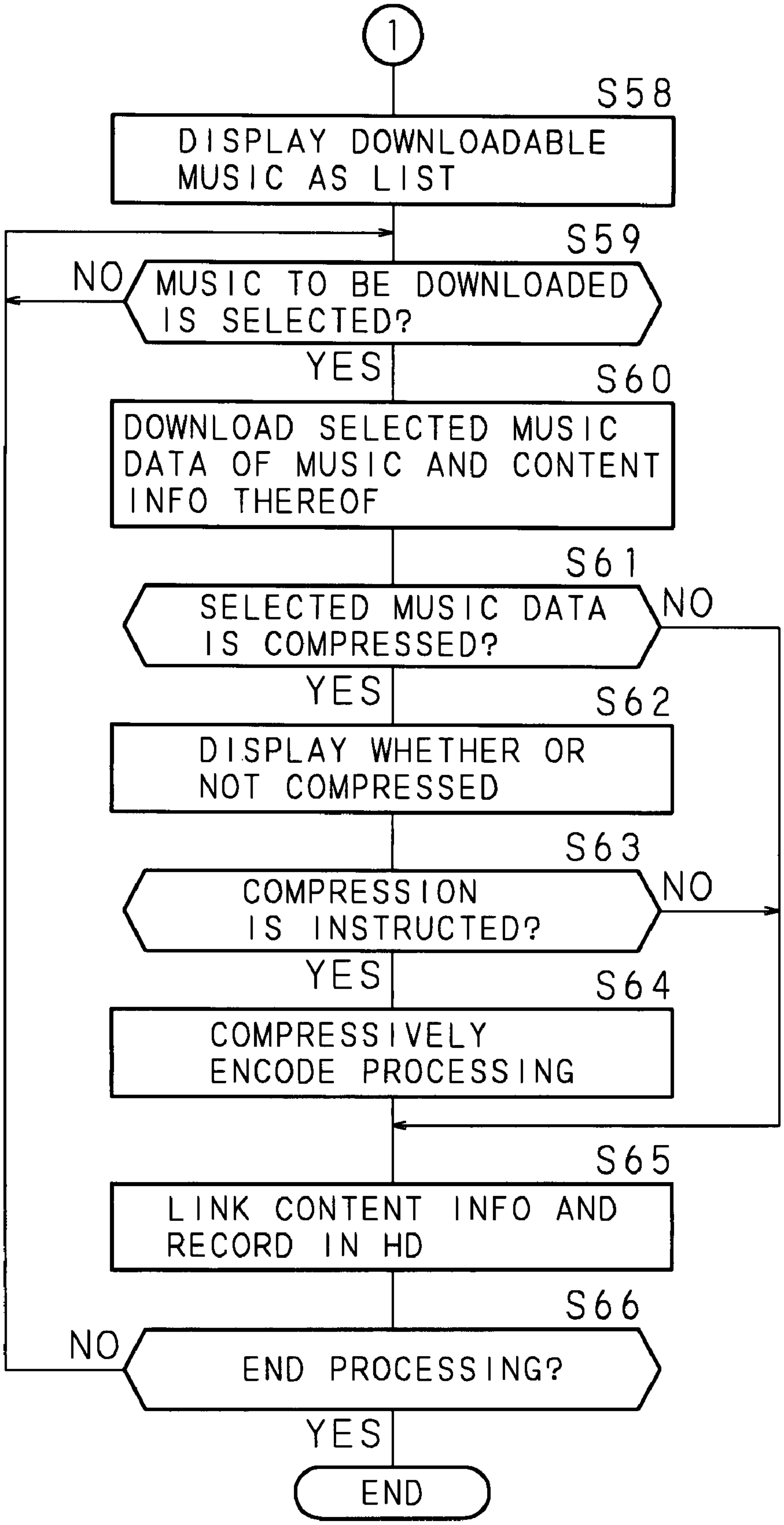
FIG. 9 is a flowchart showing the processing procedure by the MPU of the data communication mode of the broadcast receiver according to the present invention.

The broadcast receiver of the present invention has a function to perform a data communication with a computer (or directly with Web site through internet) by the data communication section 16 wherein the data communication program 16P is installed. By using this function, the music data as the content stored in the computer (or Web site) and newest broadcast station information can be downloaded. However, an explanation will be given hereunder, on the assumption that the music data and the newest broadcast station information are downloaded from the computer. Note that the content downloaded from the computer to the broadcast receiver of the present invention is sometimes called a downloaded content, to distinguish it from the broadcast content obtained by receiving the broadcasting. The explanation will be given to the processing procedure in the "data communication mode" by the MPU 13, with reference to the flowchart shown in FIG. 8 and FIG. 9. Note that needless to say, at this time, the other end of a suitable cable whose one end is connected to the computer is inserted into the slot 5 for data communication and connected to the data communication section 16.

When the music data, which is the content (downloaded content), is downloaded from the computer, the user operates the cursor key 41 and selects the "download", and operates the "SET" button 42, in the menu screen shown on the display section 2 of FIG. 2. Specifically, the MPU 13 monitors the presence/absence of the operation input by the user under a state where the menu screen is displayed (NO in step S51), and when there is the operation input (YES in step S51), the MPU 13 determines whether or not the inputted instruction is "download" (step S52). When the inputted instruction is not "download" (NO in step S52), the MPU 13 executes instructed other processing (step S53), and the processing is returned to the step S51.

Figure 10:
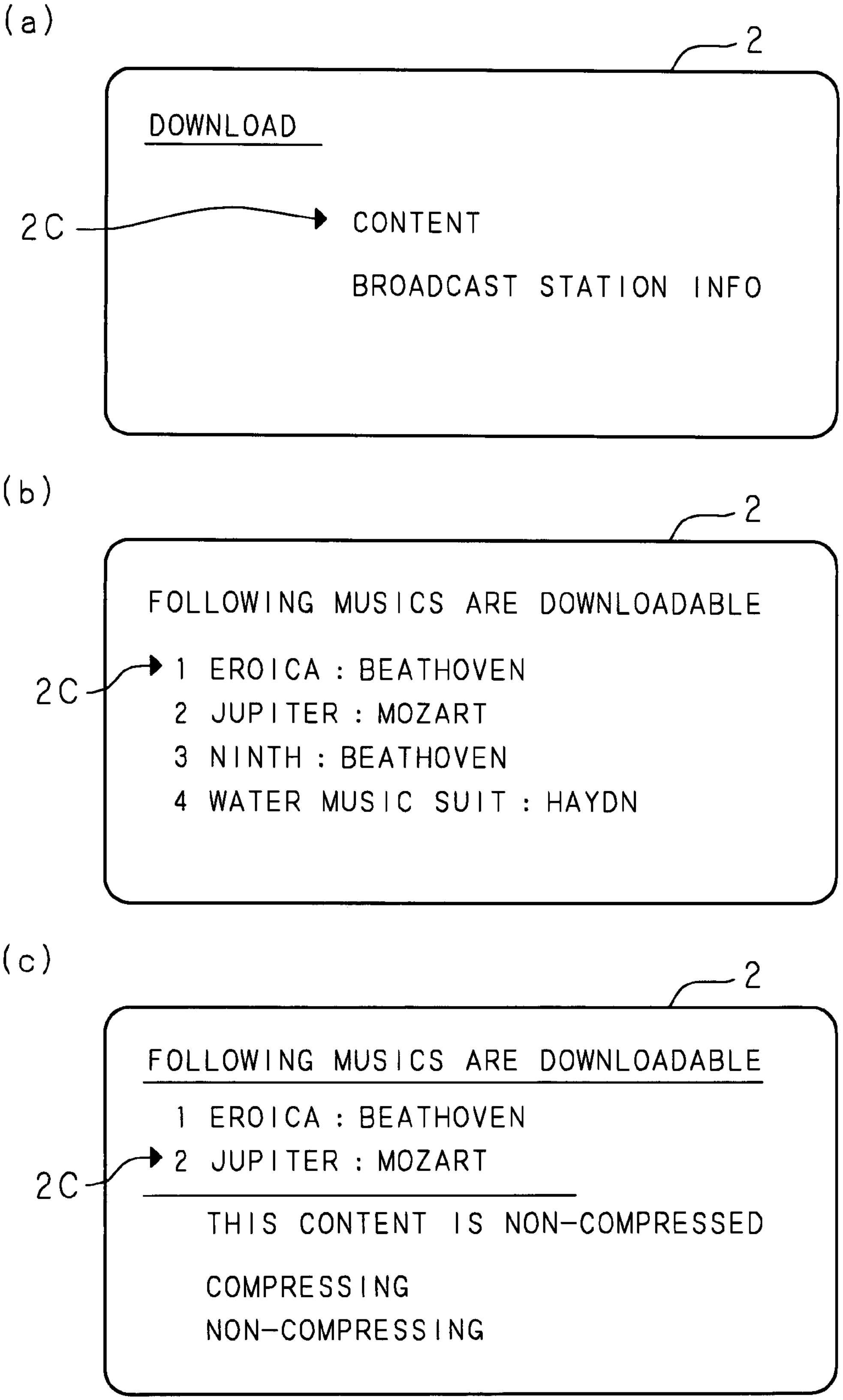
FIG. 10A, FIG. 10B and FIG. 10C are schematic views showing the display states on the display section of the data communication mode of the broadcast receiver according to the present invention.

When the inputted instruction is "download" (YES in step S52), the MPU 13 makes the display section 2 display as shown in FIG. 10A to select whether this is the download of the "content" or the download of the "broadcast station information" under the control of the display control section 18 (step S54). On this display, when the user selects the "broadcast station information" by operating the operating section 4 (NO in step S55), the MPU 13 downloads the broadcast station information stored in the computer through the data communication section 16, and temporarily stores it in the RAM (step S56), and when there is the information not registered, if compared to a registered content of the broadcast station information table 12, the MPU 13 updates the broadcast station information by registering it in the broadcast station information table 12 (step S57). Note that the broadcast station information stored in the computer can be updated from a particular Web site through the internet.

On the other hand, when the instruction of download is "content" (YES in step S55), the MPU 13 receives the music data of the music that can be downloaded and the information such as music title and performer, for example, out of its attached information (content information) through the data communication section 16, and displays such information as the list as shown in the schematic view of FIG. 10B (step S58). At this time, when the display section 2 can not display all of the information, it displays the information so as to be able to be scrolled. The MPU 13 monitors whether or not the user selects the music to be downloaded from the list displayed on the display section 2 by operating the cursor key 41 and the "SET" button 42 (step S59). Then, when the user selects the music to be downloaded (YES in step S59), the MPU 13 downloads the music data of this music and all of the content information thereof through the data communication section 16, and temporarily stores them in the RAM (step S60).

Next, the MPU 13 determines whether or not temporarily stored music data is compressed data (step S61). When the temporarily stored music data is not the non-compressed data but already compressed data (NO in step S61), the MPU 13 links the temporarily stored music data and the content information, and records them in the HD 15H (step S65). When temporarily stored music data is the non-compressed data (YES in step S61), the MPU 13 displays on the display section 2 a message urging the instruction to be given whether or not the data is compressed as shown in the schematic view of FIG. 10C (step S62). When the user gives an instruction not to compress the data by operating the operating section 4 (NO in step S63), in accordance with this instruction, the MPU 13 links temporarily stored music data and the attached information on this music and records them in the HD 15H (step S65). On the other hand, when the user gives an instruction to compress the data by operating the operating section 4 (YES in step S63), the MPU 13 makes the encoding section 14 compressively encode the temporarily stored music data in accordance with the instruction (step S64), links the compressively encoded music data and the attached information on the music, and records them in the HD 15H (step S65).

As described above, the music data of the music specified by the user and the content information, which is the attached information on this music data, are sequentially downloaded from the computer, and recorded in the HD 15H (NO in step S66). However, when the user gives an instruction to end the processing (YES in step S66), specifically, when the user operates the "STOP" button 44, the MPU 13 ends this processing.

Incidentally, in the processing of downloading the music data, which is the downloaded content, from the aforementioned computer, the music that can be downloaded is displayed as the list on the display section 2. However, needless to say, by displaying the list of the music that can be downloaded on a monitor screen of the computer, and by specifying the music on the computer side, the music data and the content information may be downloaded to the broadcast receiver of the present invention.

[Processing Procedure of Reproducing Mode]

Next, the explanation will be given to the processing procedure (reproducing mode) for reproducing each music data recorded in the HD 15H as described above. When the user selects a "reproduction list" in the menu screen displayed on the display section 2 of FIG. 2 by operating the cursor key 41, and specifies it by the "SET" button 42, the content information on each music data recorded in the HD 15H is displayed as the list on the display section 2. However, when the user specifies the "reproduction list" displayed on the display section 2, as will be described later, the display section 2 displays "reproduction list classified by broadcast stations", "downloaded reproduction list", and "reproduction list classified by genres (broadcast station+download)", and therefore in the same way as described above, the user further selects and specifies any one of the above lists.

Figure 11:
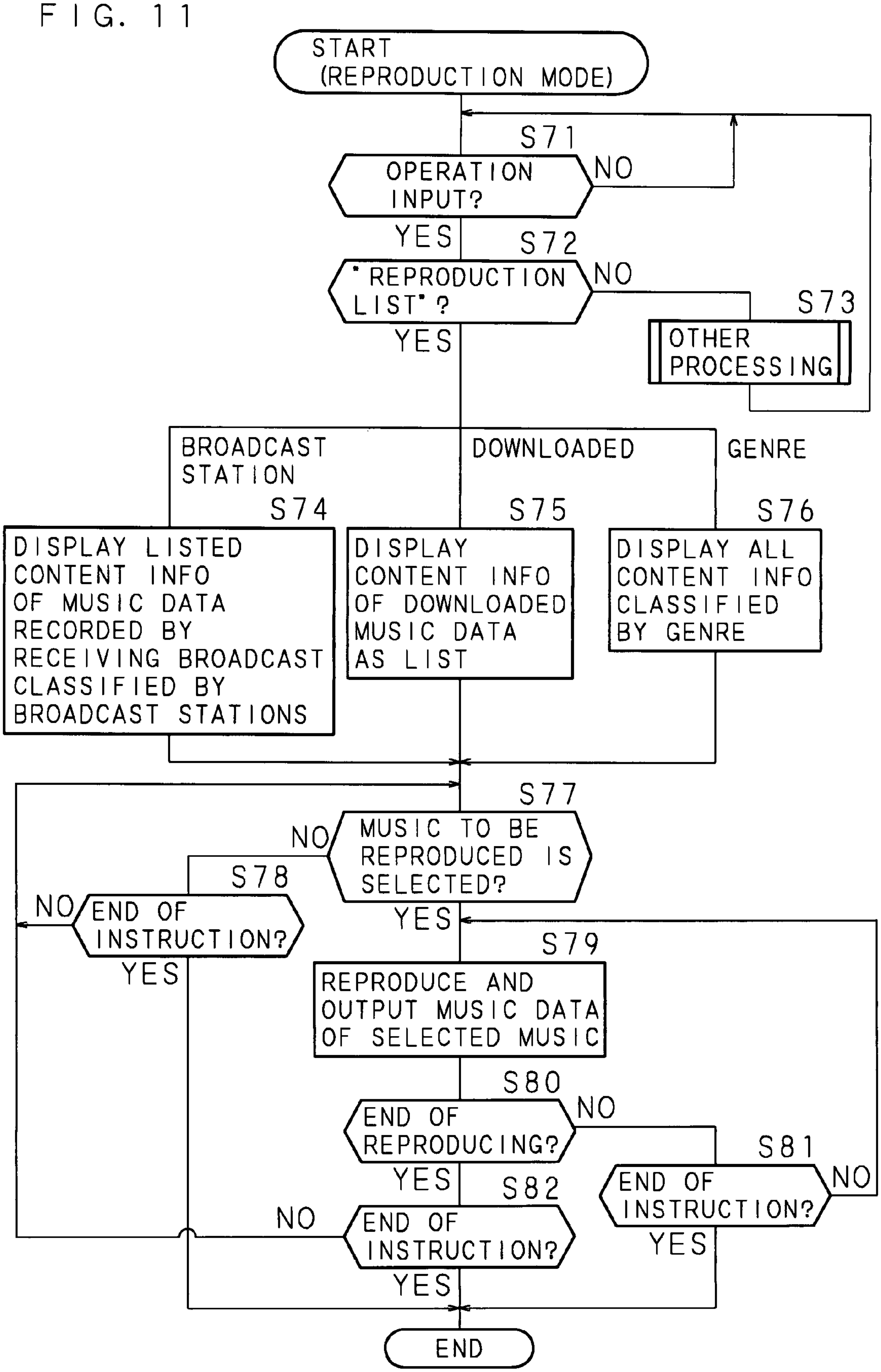
FIG. 11 is a flowchart showing the processing procedure by the MPU of the reproducing mode of the broadcast receiver according to the present invention.

Hereunder, the explanation will be given with reference to the flowchart of FIG. 11 showing the processing procedure of the "reproducing mode". The MPU 13 monitors the presence/absence of the operation input by the user under a state where the menu screen is displayed (NO in step S71), and when there is the operation input (YES in step S71), the MPU 13 judges whether or not the "reproduction list" is instructed (step S72). When the "reproduction list" is not instructed (NO in step S72), the MPU 13 executes other instructed processing (step S73), and the processing is returned to the step S71.

Figure 12:
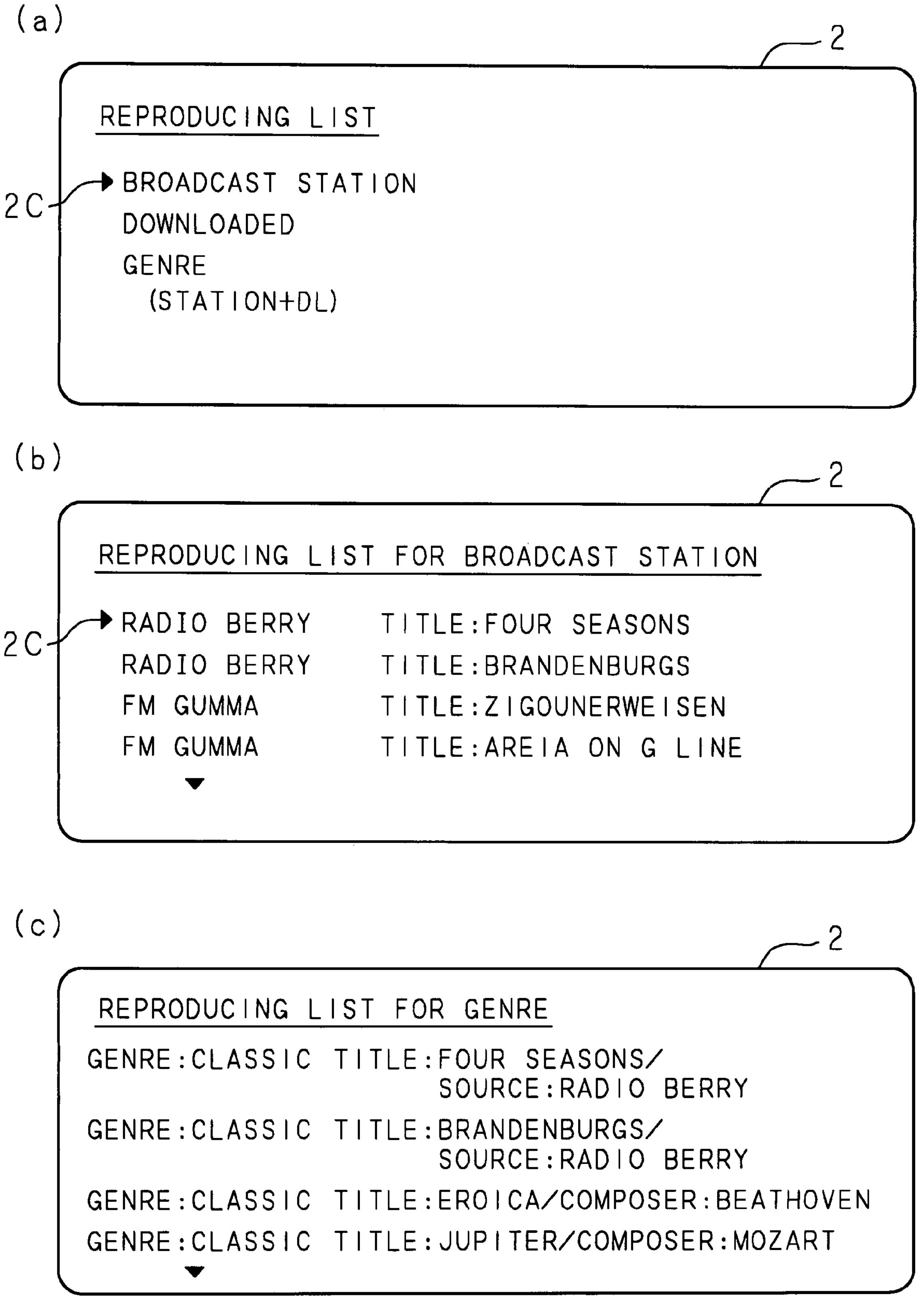
FIG. 12A, FIG. 12B and FIG. 12C are schematic views showing the display states on the display section of the reproducing mode of the broadcast receiver according to the present invention.

When the inputted instruction is "reproduction list" (YES in step S72), as described above, the MPU 13 makes the display section 2 display the "reproduction list classified by broadcast stations", "downloaded reproduction list", and "reproduction list classified by genres (broadcast station+download)", as shown in the schematic view of FIG. 12A, and in the same way as described above, accepts selecting and specifying by the user.

When the user specifies the "reproduction list classified by broadcast stations", the MPU 13 displays and listed on the display section 2 the content information on the music data obtained by receiving and recording the broadcast of the broadcast station, out of all of the music data recorded in the HD 15H (step S74). FIG. 12B is the schematic view showing a display state of the display section 2 at this time. In this example, the content information (in the example of the figure, only music title) on the music data obtained by receiving the broadcast of each broadcast station classified by broadcast stations and recording it in the HD 15H is grouped and displayed. When the user specifies the "downloaded reproduction list", the MPU 13 displays as the list on the display section 2 the content downloaded from the computer, in other words, the content information on the music data whose broadcast station information is not included in the content information, out of all of the music data recorded in the HD 15H (step S75). Further, when the user specifies the "reproduction list classified by genres", as shown in FIG. 12C, the content information on the music data of each genre classified by genres is grouped and displayed on the display section 2, out of all of the music data recorded in the HD 15H (step S76). Note that here, when the name of the broadcast station is displayed as the content information, this is a broadcast content (music received from the broadcast), and when the name of the broadcast station is not displayed, this is the downloaded content (music downloaded from the computer), respectively.

In addition, in the example shown in FIG. 12B, the name of the broadcast station whose broadcast is received when the individual music is recorded, and the music title as the content information are respectively displayed. Also, in the example shown in FIG. 12C, one genre (classical music) is displayed on the display section 2. However, the music title of a plurality of genres can be displayed as the list. Further, when the name of the broadcast station is displayed as a "source" after "/" after the music title, this means that the broadcast content is recorded. Also, when the name of a person (or name of a band, or unit) is displayed as an "author", this means the downloaded content from the computer. However, by using a character, an icon, and the like, the aforementioned information can be further easily made recognizable by the user.

In any case, since a plurality of or a lot of content information on the music data is displayed as the list on the display section 2, the music is reproduced when the user moves the cursor by operating the cursor key 41, thereby specifying one piece of the music out of the plurality of music data, and then operating the "SET" button 42 (or by specifying the plurality of music data, a so-called play list can be created). Specifically, the MPU 13 monitors whether any one of the music out of the plurality of music's displayed as the list on the display section 2 is selected and specified (NO in step S77 and NO in step S78), and when the end of the processing is instructed without selecting and specifying the music, specifically, when the "STOP" button 44 is operated (NO in step S77, and YES in step S78), the processing is ended. At this time, the menu screen is displayed on the display section 2.

When any one of the music is selected and specified (YES in step S77), the MPU 13 reads the selected music data from the HD 15H. When the read music data is not compressed, it is converted into an analogue audio signal at an audio signal output section 21 as it is, and when the read music data is compressed, it is converted into the analogue audio signal at the audio signal output section 21 after expansion decoding processing is applied thereto at a decoding section 20, which is then respectively outputted to the headphone jack 6 (step S79). Thereafter, the MPU 13 monitors whether or not the user gives an instruction to end the processing by operating the "STOP" button 44, until the reproduction of the music data being reproduced ends (NO in step S80 and NO in step S81). When the user gives an instruction to end the processing by operating the "STOP" button 44 (YES in step S81), the MPU ends this processing. However, when no instruction to end the processing is given by operating the "STOP" button 44 by the user until the reproduction of the music data being reproduced ends, the MPU 13 makes the processing returned to the step S77, and monitors which music is selected and specified next by the user. However, when an instruction is given to end the processing by operating the "STOP" button 44 by the user at the time point when the reproduction of one piece of music ends (YES in step S80 and YES in step S82), the MPU 13 ends this processing.

Figure 13:
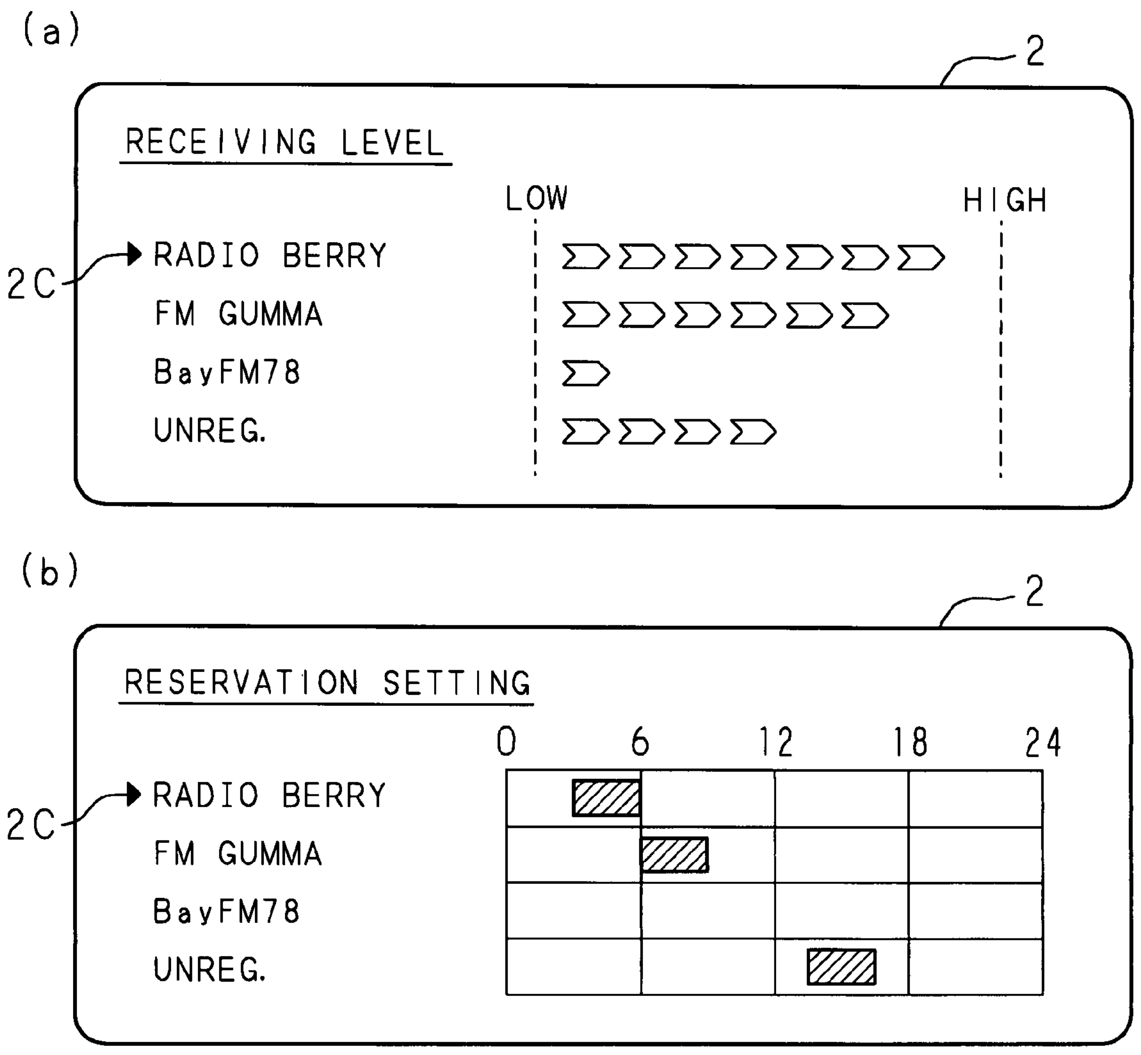
FIG. 13A and FIG. 13B are schematic views showing the display states on the display section of the broadcast receiver according to the present invention.

In addition, in the aforementioned "broadcast station search mode" and "broadcast receiving mode", as shown in the schematic view of FIG. 13A, by graphic-displaying a receivable receiving level of the broadcast station on the display section 2, the user can reference this receiving level when selecting the broadcast station. Specifically, when an electric field strength of a broadcast carrier wave detected by the search circuit of the broadcast receiving section 10 is formed into digital data and graphic-displayed, it becomes easy to select the broadcast station by the user.

Further, various devices like the broadcast receiver of the present invention generally adopts a function to automatically receive the program in a set time zone, or automatically record the content simultaneously with reception, by setting a reservation of viewing and listening of the broadcast in the recording medium. Accordingly, the broadcast receiver of the present invention is also capable of receiving and recording (recording the music data, which is the content) the broadcast of the broadcast station set in accordance with the operation of the operating section 4.

Specifically, when the user operates the operating section 4 by a predetermined procedure under a state where a receivable broadcast stations are displayed as the list on the display section 2 in the aforementioned "broadcast station search mode" and "broadcast receiving mode", a portion shown by hatching in FIG. 13B is set as a reservation start time and a reservation end time (or the reservation start time and time period from the reservation start time). Then, the MPU 13 reads such information and records it in the RAM or the HD 15H. The MPU 13 reads such information and records it in the RAM or the HD 15H. The MPU 13 receives the broadcast and records the received broadcast content (music data) in the HD 15H, in accordance with the absolute time clocked by the timer built in the MPU 13 itself.

As described above, according to the broadcast receiver of the present invention, it becomes possible to search all of the receivable broadcast stations and directly select one of them and receive it. In addition, by having the broadcast station information table previously storing the information related to the searched broadcast station, various attached information related to the searched broadcast station can be displayed, and in this case, it is further possible to specify the information classified by regions. Further, when the broadcast station is newly opened, it becomes possible to update the broadcast station information table with the newest information by data communicating means with computer.

In addition, according to the broadcast receiver of the present invention, the music data, which is the content downloaded from the computer, can be reproduced, and by receiving the broadcast and recording the content thereof, it becomes possible to record a newest music or oldies that can not be downloaded from the computer, or the music data of the music belonging to the genre that can not be downloaded from the computer. Therefore, a significantly wide choice of the music that can be recorded and reproduced is allowed.

Further, according to the broadcast receiver of the present invention, the music data downloaded from the computer and the music data received and recorded from the broadcast station can be collectively displayed, and can be displayed by classified by each source, or can be displayed classified by genres, and a convenience is thereby improved. Moreover, the broadcast receiver of the present invention has functions to record the music by receiving it from the broadcast, download it from the computer, and further reproduce such music, and in addition, the broadcast receiver of the present invention can be operated with a few operating buttons, thereby making it possible to realize a miniaturization.

Further, according to the broadcast receiver of the present invention, either one of the compression or non-compression can be selected when the music data, being the content, is recorded. Therefore, a proper use is possible such as the music desired to listen by high quality may be non-compressively recorded, or compressively recording the data when a residual storage capacity of the recording medium becomes little.

In addition, in the aforementioned explanation, the explanation is given on the assumption that the information to be recorded/reproduced by the broadcast receiver of the present invention is the information on the music. However, other than the information related to the music, of course it is possible to process a still picture or a moving picture.

As this invention may be embodied in several forms without departing from the spirit of essential characteristics thereof, the present embodiment are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A broadcast receiver comprising:

broadcast receiving means for receiving a broadcast;

broadcast station searching means for searching a carrier frequency of a broadcast station receivable by said broadcast receiving means, said searching including a search of a frequency band allotted to broadcast stations from a lower limit side to an upper limit side of the frequency band;

a display section;

storing means for storing a receivable carrier frequency searched by said broadcast station searching means;

display controlling means for displaying on said display section the carrier frequency stored in said storing means as a list of broadcast station information;

accepting means for accepting specifying of any one out of the list of the broadcast station information displayed on said display section; and receiving controlling means for making said broadcast receiving means receive the broadcast of the carrier frequency corresponding to the specifying accepted by said accepting means, wherein said broadcast station searching means searches a carrier frequency band received by said broadcast receiving means and determines that the carrier frequency whose receiving level is detected to be a predetermined threshold value or more is the carrier frequency of the broadcast station, and said display controlling means displays the receiving level detected by said broadcast searching means corresponding to the list of the broadcast station information displayed on said display section.

2. A broadcast receiver, comprising:

broadcast receiving means for receiving a broadcast;

broadcast station searching means for searching a carrier frequency of a broadcast station receivable by said broadcast receiving means, said searching including a search of a frequency band allotted to broadcast stations from a lower limit side to an upper limit side of the frequency band;

a display section;

storing means for storing a receivable carrier frequency searched by said broadcast station searching means;

display controlling means for displaying on said display section the carrier frequency stored in said storing means as a list of broadcast station information;

accepting means for accepting specifying of any one out of the list of the broadcast station information displayed on said display section;

receiving controlling means for making said broadcast receiving means receive the broadcast of the carrier frequency corresponding to the specifying accepted by said accepting means;

content information receiving means for receiving content information related to a content of the broadcast being received by said broadcast receiving means under a control of said receiving controlling means;

record controlling means for recording in a recording medium data of the content of the broadcast received by said broadcast receiving means and the content information related to the content received by said content information receiving means correspondingly with each other; and reproducing means for reading and reproducing the data of the content recorded in said recording medium;

wherein said display controlling means reads the content information recorded in said recording medium from said recording medium and displays them on said display section as the list of the content, said accepting means accepts specifying of any one out of the list of the content displayed on said display section, and said reproducing means reads and reproduces the data of the content stored in said recording medium correspondingly to the specifying accepted by said accepting means.

3. The broadcast receiver as set forth in claim 2, further comprising:

timer means for clocking time, wherein said accepting means accepts specifying of any one out of the list of the broadcast station information displayed on said display section, start time of recording the content and content information by receiving the broadcast of the carrier frequency corresponding to the accepted specifying, and end time of recording or recording time period, said broadcast receiving means receives the broadcast in accordance with clocking of said timer means, and in accordance with the broadcast station information accepted by said accepting means, the start time of recording, and the end time of recording or the recording time thereof, and said record controlling means records in said recording medium the broadcast received by said broadcast receiving means in accordance with clocking of said timer means, and in accordance with the broadcast station information accepted by said accepting means, the start time of recording, the end time of recording or the recording time period thereof.

4. The broadcast receiver as set forth in claim 3, wherein said display controlling means displays on said display section the broadcast station information, the start time of recording of the content of the broadcast and the content information in said recording medium, and the end time of recording or the recording time period, accepted by said accepting means.

5. The broadcast receiver as set forth in claim 2, further comprising:

communicating means capable of communicating with an external computer, wherein said record controlling means records in said recording medium the data of the content included in the information received from the external computer by said communicating means and the content information related to the content correspondingly with each other.

6. The broadcast receiver as set forth in claim 5, wherein said communicating means is capable of receiving from the external computer the information in which a carrier wave frequency allotted to each of a plurality of broadcast stations and the attached information of the broadcast station are corresponded with each other, and said broadcast station information table is made to be updated the storage content based on the information received from the external computer by said communicating means.

7. The broadcast receiver as set forth in claim 5, further comprising:

encoding means for compressively encoding the data of the content received from the external computer by said communicating means; and decoding means for decoding the data compressively encoded by said encoding means;

wherein said accepting means accepts a selection whether or not the data of the content received from the external computer by said communicating means is compressively encoded by said encoding means, said record controlling means makes said encoding means compressively encode the data of the content received from the external computer by said communicating means and records it in said recording medium, when said accepting means accepts a selection of compressively encoding, and said reproducing means makes said decoding means decode the data, when reproducing the data of the content compressively encoded and recorded in said recording medium.

8. The broadcast receiver as set forth in claim 7, further comprising:

extracting condition accepting means for accepting a condition for extracting the content information recorded in said recording medium; and extracting means for extracting the content information recorded in said recording medium, in accordance with the condition accepted by said extracting condition accepting means;

wherein said display controlling means reads the content information extracted from the recording medium by said extracting means and makes said display section display the extracted content information as a list of the content, said accepting means accepts specifying of any one out of the content information displayed on said display section, and said reproducing means reproduces the content stored in said recording medium correspondingly to the specifying accepted by said accepting means.

9. The broadcast receiver as set forth in claim 8, wherein said content is a music, and said content information includes at least one of a genre, music title, a performer, and an author of the music, which is the corresponding content.

10. The broadcast receiver as set forth in claim 8, wherein said record controlling means records in said recording medium data of the content of a broadcast received by said broadcast receiving means and the content information related to the content received by said content information receiving means, and in addition, attached information stored correspondingly to the received broadcast station in said broadcast station information table correspondingly with each other, and said extracting means rearranges and extracts the content information recorded in said recording medium, in accordance with the presence/absence of the attached information, the content of the attached information, or the content of the content information.

11. A broadcast receiver, comprising: broadcast receiving means for receiving a broadcast;

broadcast station searching means for searching a carrier frequency of a broadcast station receivable by said broadcast receiving means, said searching including a search of a frequency band allotted to broadcast stations from a lower limit side to an upper limit side of the frequency band;

a display section;

a broadcast station information table previously storing carrier frequencies allotted to a plurality of broadcast stations, and attached information related to the broadcast station correspondingly to each carrier frequency;

display controlling means for reading the attached information stored in said broadcast station information table correspondingly to a receivable carrier frequency searched by said broadcast station searching means, and displaying them on said display section as a list of broadcast station information;

accepting means for accepting specifying of any one out of the list of the broadcast station information displayed on said display section; and receiving controlling means for making said broadcast receiving means receive the broadcast of the carrier frequency corresponding to the specifying accepted by said accepting means.

12. The broadcast receiver as set forth in claim 11, wherein said attached information includes at least one of a name, a nickname, and a genre of broadcast content of the broadcast station.

13. The broadcast receiver as set forth in claim 11, wherein a plurality of said broadcast station information tables are provided for each region, said accepting means accepts regional specifying, and said display controlling means reads the attached information stored in the broadcast station information table of the region corresponding to the regional specifying accepted by said accepting means, and displays it on said display section as the list of the broadcast station information.

14. The broadcast receiver as set forth in claim 11, wherein said broadcast station searching means searches a carrier frequency band received by said broadcast receiving means and determines that the carrier frequency whose receiving level is detected to be a predetermined threshold value or more is the carrier frequency of the broadcast station, and said display controlling means displays the receiving level detected by said broadcast searching means corresponding to the list of the broadcast station information displayed on said display section.

15. The broadcast receiver as set forth in claim 11, further comprising:

content information receiving means for receiving content information related to a content of the broadcast being received by said broadcast receiving means under a control of said receiving controlling means;

record controlling means for recording in a recording medium data of the content of the broadcast received by said broadcast receiving means and the content information related to the content received by said content information receiving means correspondingly with each other; and reproducing means for reading and reproducing the data of the content recorded in said recording medium;

wherein said display controlling means reads the content information recorded in said recording medium from said recording medium and displays them on said display section as the list of the content, said accepting means accepts specifying of any one out of the list of the content displayed on said display section, and said reproducing means reads and reproduces the data of the content stored in said recording medium correspondingly to the specifying accepted by said accepting means.

16. The broadcast receiver as set forth in claim 15, further comprising:

timer means for clocking time, wherein said accepting means accepts specifying of any one out of the list of the broadcast station information displayed on said display section, start time of recording the content and content information by receiving the broadcast of the carrier frequency corresponding to the accepted specifying, and end time of recording or recording time period, said broadcast receiving means receives the broadcast in accordance with clocking of said timer means, and in accordance with the broadcast station information accepted by said accepting means, the start time of recording, and the end time of recording or the recording time thereof, and said record controlling means records in said recording medium the broadcast received by said broadcast receiving means in accordance with clocking of said timer means, and in accordance with the broadcast station information accepted by said accepting means, the start time of recording, the end time of recording or the recording time period thereof.

17. The broadcast receiver as set forth in claim 16, wherein said display controlling means displays on said display section the broadcast station information, the start time of recording of the content of the broadcast and the content information in said recording medium, and the end time of recording or the recording time period, accepted by said accepting means.

18. The broadcast receiver as set forth in claim 15, further comprising:

communicating means capable of communicating with an external computer, wherein said record controlling means records in said recording medium the data of the content included in the information received from the external computer by said communicating means and the content information related to the content correspondingly with each other.

19. The broadcast receiver as set forth in claim 18, wherein said communicating means is capable of receiving from the external computer the information in which a carrier wave frequency allotted to each of a plurality of broadcast stations and the attached information of the broadcast station are corresponded with each other, and said broadcast station information table is made to be updated the storage content based on the information received from the external computer by said communicating means.

20. The broadcast receiver as set forth in claim 18, further comprising:

encoding means for compressively encoding the data of the content received from the external computer by said communicating means; and decoding means for decoding the data compressively encoded by said encoding means;

wherein said accepting means accepts a selection whether or not the data of the content received from the external computer by said communicating means is compressively encoded by said encoding means, said record controlling means makes said encoding means compressively encode the data of the content received from the external computer by said communicating means and records it in said recording medium, when said accepting means accepts a selection of compressively encoding, and said reproducing means makes said decoding means decode the data, when reproducing the data of the content compressively encoded and recorded in said recording medium.

21. The broadcast receiver as set forth in claim 20, further comprising:

extracting condition accepting means for accepting a condition for extracting the content information recorded in said recording medium; and extracting means for extracting the content information recorded in said recording medium, in accordance with the condition accepted by said extracting condition accepting means;

wherein said display controlling means reads the content information extracted from the recording medium by said extracting means and makes said display section display the extracted content information as a list of the content, said accepting means accepts specifying of any one out of the content information displayed on said display section, and said reproducing means reproduces the content stored in said recording medium correspondingly to the specifying accepted by said accepting means.

22. The broadcast receiver as set forth in claim 21, wherein said content is a music, and said content information includes at least one of a genre, music title, a performer, and an author of the music, which is the corresponding content.

23. The broadcast receiver as set forth in claim 21, wherein said record controlling means records in said recording medium data of the content of a broadcast received by said broadcast receiving means and the content information related to the content received by said content information receiving means, and in addition, attached information stored correspondingly to the received broadcast station in said broadcast station information table correspondingly with each other, and said extracting means rearranges and extracts the content information recorded in said recording medium, in accordance with the presence/absence of the attached information, the content of the attached information, or the content of the content information.

* * * * *